(12) United States Patent
Hasegawa et al.

(10) Patent No.: US 7,026,397 B2
(45) Date of Patent: Apr. 11, 2006

(54) CURABLE COMPOSITIONS

(75) Inventors: Nobuhiro Hasegawa, Settsu (JP); Yoshiki Nakagawa, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/203,422

(22) PCT Filed: Feb. 8, 2001

(86) PCT No.: PCT/JP01/00873

§ 371 (c)(1),
(2), (4) Date: Nov. 26, 2002

(87) PCT Pub. No.: WO01/59011

PCT Pub. Date: Aug. 16, 2001

(65) Prior Publication Data

US 2003/0166795 A1 Sep. 4, 2003

(30) Foreign Application Priority Data

| Feb. 8, 2000 | (JP) | 2000-030369 |
| Mar. 27, 2000 | (JP) | 2000-085639 |
| Mar. 27, 2000 | (JP) | 2000-085641 |
| May 22, 2000 | (JP) | 2000-150094 |

(51) Int. Cl.
*C08K 3/04* (2006.01)
(52) U.S. Cl. ............ 525/100; 525/101; 524/424; 524/427; 524/862
(58) Field of Classification Search ............ 525/100, 525/101; 524/424, 427, 862
See application file for complete search history.

(56) References Cited

U.S. PATENT DOCUMENTS

| 3,660,133 A | * | 5/1972 | Van Der Schuyt et al. . 106/473 |
| 5,321,082 A | * | 6/1994 | Ohsugi et al. ............... 525/101 |
| 5,364,922 A | * | 11/1994 | Bilgrien et al. ............... 528/15 |
| 5,486,421 A | | 1/1996 | Kobayashi |
| 5,733,978 A | * | 3/1998 | Kobayashi ................... 525/100 |
| 5,789,485 A | * | 8/1998 | Kobayashi et al. ......... 525/100 |
| 5,986,014 A | * | 11/1999 | Kusakabe et al. .......... 525/342 |
| 6,320,010 B1 | * | 11/2001 | Sakaguchi et al. ............ 528/25 |

FOREIGN PATENT DOCUMENTS

| EP | 0655471 A1 | | 5/1995 |
| EP | 844 257 | * | 5/1998 |
| EP | 0999236 A1 | | 5/2000 |
| JP | 7150044 | | 5/1995 |
| JP | 9-272714 | * | 10/1997 |
| JP | 9-272715 A | | 10/1997 |
| JP | 11049956 | | 2/1999 |
| JP | 11080570 | | 3/1999 |

* cited by examiner

*Primary Examiner*—Margaret G. Moore
(74) *Attorney, Agent, or Firm*—Connoly Bove Lodge & Hutz LLP

(57) ABSTRACT

The present invention is constituted of a curable composition which comprises, as essential components, the following four components:
(A) a vinyl polymer having at least one hydrosilylatable alkenyl group within the molecule,
(B) a hydrosilyl group-containing compound,
(C) a hydrosilylation catalyst, and
(D) an aliphatic unsaturated bond-containing compound,
and which may further comprise
(E) an amine compound, or
the following three components:
(A) a vinyl polymer having at least one hydrosilylatable alkenyl group within the molecule,
(B) a hydrosilyl group-containing compound, and
(G) an organic compound having at least one hydrosilylatable alkenyl or alkynyl group within the molecule [other than the above-mentioned component (A)], or
the following three components:
(A) a vinyl polymer having at least one hydrosilylatable alkenyl group within the molecule,
(B) a hydrosilyl group-containing compound, and
(H) carbon black.

45 Claims, No Drawings

CURABLE COMPOSITIONS

TECHNICAL FIELD

The present invention relates to a curable composition. More particularly, it relates to a curable composition capable of curing via the hydrosilylation reaction.

BACKGROUND ART

In Japanese Kokai Publication Hei-09-272714, among others, there is disclosed a curable composition which comprises an alkenyl group-containing vinyl polymer and a hydrosilyl group-containing compound and is capable of curing via the hydrosilylation reaction.

However, the viscosity of the above composition, the main component of which is a polymer, is not always low and, therefore it is necessary to improve the composition with respect to its workability, processability and so forth. The method generally employed for reducing the viscosity comprises diluting the composition with a plasticizer or the like having a lower viscosity as compared with the main component. However, a nonreactive plasticizer does not participate in the curing reaction, hence is not bonded to the network of the crosslinked product, so that marked decreases in mechanical properties, heat resistance and other properties as resulting from the addition of a plasticizer cannot be avoided. As for the heat resistance, in particular, the plasticizer evaporation at high temperatures is a problem, and method of improvement in that respect has been searched for.

On the other hand, the polymer mentioned above has a property such that the viscosity decreases as the temperature increases. If compositions containing the above-mentioned polymer are handled at temperatures higher than ordinary temperature making good use of such property, the workability may presumably be secured and, in addition, any decrease in reliability with respect to physical properties will probably not be caused.

However, the above composition is very poor in storage stability at room temperature and higher temperatures and it tends to gelate readily at elevated temperatures.

Furthermore, the curing products obtained from the above curable composition are required to have higher strength properties in certain fields of utilization.

SUMMARY OF THE INVENTION

A first object of the present invention is to provide a curable composition which comprises a vinyl polymer excellent in oil resistance, heat resistance and weatherability, among others, and is curable by the hydrosilylation reaction and which can be handled with ease at temperatures higher than room temperature and is excellent in storage stability at elevated temperatures so that the workability can be improved and the incorporation of various additives and/or fillers can thus be facilitated.

A second object of the invention is to provide a curable composition which comprises a vinyl polymer excellent in oil resistance, heat resistance and weatherability, among others, is curable by the hydrosilylation reaction and has a low viscosity so that the workability can be improved and the incorporation of various additives and/or fillers can thus be facilitated, and which can give curing products with various properties, such as mechanical properties and heat resistance, thereof being prevented from being deteriorated.

A third object of the invention is to provide a curable composition which comprises a vinyl polymer excellent in oil resistance, heat resistance and weatherability, among others, and is curable by the hydrosilylation reaction and which can give curing products higher in tensile strength at break without affecting the good heat resistance, oil resistance, curability and so on.

Thus, in a first aspect, the invention provides a curable composition which comprises, as essential components, the following four components:
(A) a vinyl polymer having at least one hydrosilylatable alkenyl group within the molecule,
(B) a hydrosilyl group-containing compound,
(C) a hydrosilylation catalyst, and
(D) an aliphatic unsaturated bond-containing compound.

In a preferred mode of embodiment of the first aspect of the invention, the above curable composition further contains (E) an amine compound.

In its first aspect, the invention also provides a method of using the above curable composition which comprises causing the curable composition to flow at a temperature not lower than 30° C. but lower than 100° C.

Further, in accordance with the first aspect of the invention, there is provided a method of using the above curable composition which comprises causing the curable composition to flow at a temperatures not lower than 30° C. but lower than 100° C. and further carrying out the curing reaction while causing the composition to flow.

In a second aspect, the invention provides a curable composition which comprises, as essential components, the following three components:
(A) a vinyl polymer having at least one hydrosilylatable alkenyl group within the molecule,
(B) a hydrosilyl group-containing compound, and
(G) an organic compound having at least one hydrosilylatable alkenyl or alkynyl group within the molecule [other than the above-mentioned component (A)].

In a third aspect, the invention provides a curable composition which comprises, as essential components, the following three components:
(A) a vinyl polymer having at least one hydrosilylatable alkenyl group within the molecule,
(B) a hydrosilyl group-containing compound, and
(H) carbon black.

In the following, the present invention is described in detail.

DETAILED DISCLOSURE OF THE INVENTION

First, the first aspect of the invention is described in detail.

<<Re: Vinyl Polymer (A)>>

<Main Chain>

The vinyl monomer constituting the main chain of the vinyl polymer (A) is not particularly restricted but includes various species. As examples, there may be mentioned (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth) acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth) acrylate, 2-hydroxyethyl (meth) acrylate, 2-hydroxypropyl (meth)

acrylate, stearyl (meth)acrylate, glycidyl (meth)acrylate, 2-aminoethyl (meth)acrylate, γ-(methacryloyloxypropyl)trimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, and 2-perfluorohexadecylethyl (meth)acrylate; aromatic vinyl monomers such as styrene, vinyltoluene, α-methylstyrene, chlorostyrene, styrenesulfonic acid and salts thereof; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and maleic acid monoalkyl esters and dialkyl esters; fumaric acid, and fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; vinyl chloride, vinylidene chloride, allyl chloride, allyl alcohol, and the like. These may be used singly or a plurality of them may be subjected to copolymerization.

Among them, (meth)acrylic monomers, nitrile group-containing vinyl monomers, aromatic vinyl monomers, fluorine-containing vinyl monomers and silicon-containing vinyl monomer are preferred. From the viewpoint of physical properties and like properties of products, aromatic vinyl monomers and (meth)acrylic monomers are more preferred. Acrylic ester monomers and methacrylic ester monomers are still more preferred, acrylic ester monomers are particularly preferred, and butyl acrylate is most preferred. In the practice of the invention, these preferred monomers may be copolymerized or block copolymerized with another monomer or other monomers. On such occasion, these preferred monomers preferably account for at least 40% by weight of the monomer composition. In the above form of expression, "(meth)acrylic acid", for instance, means acrylic acid and/or methacrylic acid.

The molecular weight distribution, namely the ratio between the weight average molecular weight and number average molecular weight as determined by gel permeation chromatography (GPC), of the vinyl polymer (A) is not particularly restricted but preferably is less than 1.8, preferably not more than 1.7, more preferably not more than 1.6, still more preferably not more than 1.5, particularly preferably not more than 1.4, most preferably not more than 1.3. In the practice of the invention, the GPC measurement is generally carried out on a polystyrene gel column using chloroform as a mobile phase, and the number average molecular weight and the like can be determined on the polystyrene equivalent basis.

The number average molecular weight of the vinyl polymer (A) is not particularly restricted but preferably is within the range of 500 to 1,000,000, more preferably 1,000 to 100,000. When the molecular weight is too low, the properties intrinsic in the vinyl polymer will hardly be manifested. When, conversely, it is excessively high, the composition becomes difficult to handle.

<Method of Polymerization>

The vinyl polymer (A) can be obtained by various methods of polymerization; the method is not particularly restricted. In view of the flexibility in monomer selection and the ease of control, radical polymerization is preferred. Among variations of radical polymerization, controlled radical polymerization is preferred, living radical polymerization is more preferred, and atom transfer radical polymerization is particularly preferred.

These are explained in the following.

Radical Polymerization

Methods of synthesizing functional group-containing vinyl polymers by radical polymerization can be classified into "ordinary radical polymerization methods" and "controlled radical polymerization methods".

The "ordinary radical polymerization methods" comprise merely copolymerizing a specific functional group-containing vinyl monomer (hereinafter referred to as "functional monomer") with a vinyl monomer(s) using an azo compound, a peroxide or a like polymerization initiator. On the other hand, the "controlled radical polymerization methods" are methods by which a specific functional group can be introduced into a controlled site(s), for example a terminus.

Ordinary Radical Polymerization

The "ordinary radical polymerization methods" are simple and easy to perform and can also be used in the practice of the invention. In the present case of copolymerization, however, those methods allow the specific functional group-containing monomer to be introduced into the polymer only at random. Therefore, for obtaining polymers with a high percentage of functionalization, it is necessary to use the functional monomer in fairly large amounts. When, conversely, only a small amount of the monomer is used, the problem arises that the proportion of polymer molecules formed without introduction of this specific functional group increases. Further, since they consist in free radical polymerization, there is another problem, namely only polymers with a wide molecular weight distribution and a high viscosity can be obtained.

Controlled Radical Polymerization

The "controlled radical polymerization methods" can be further classified into "chain transfer agent methods" and "living radical polymerization methods".

The "chain transfer agent methods" are characterized in that the polymerization is carried out using a chain transfer agent having a specific functional group to give functional group-terminated vinyl polymers. On the other hand, the "living radical polymerization methods" are characterized in that the growing polymer termini can grow, without undergoing termination and like side reactions, as a result of the employment of a special polymerization system. Accordingly, polymers with a molecular weight approximately as designed can be obtained by "living radical polymerization".

Chain Transfer Agent Methods

The "chain transfer agent methods" can introduce a functional group into a polymer at its terminus relatively quantitatively as compared with the "ordinary radical polymerization methods"; hence can be used in the practice of the present invention. However, they require the use of a fairly large amount of a chain transfer agent having a specific functional group relative to the initiator, hence have economical problems, inclusive of treatment-related problems, for example chain transfer agent recovery. Like the above-mentioned "ordinary radical polymerization methods", there is also the problem that only polymers having a wide molecular weight distribution and a high viscosity can be obtained because of their consisting in free radical polymerization.

The technique of radical polymerization using a chain transfer agent (telomer) is not particularly restricted but mention may be made of the following two methods as methods of obtaining vinyl polymers having terminal structures suited for the purpose of the present invention. Thus, the one method, such as the one disclosed in Japanese Kokai Publication Hei-04-132706, uses a halogenated hydrocarbon as the chain transfer agent to give a halogen-terminated polymer, and the other, such as the one disclosed in Japanese Kokai Publication Sho-61-271306, JP 2594402 or Japanese Kokai Publication Sho-54-47782, uses a hydroxyl-containing mercaptan or a hydroxyl-containing polysulfide as the chain transfer agent to give a hydroxyl-terminated polymer.

Living Radical Polymerization

In radical polymerization, the rate of polymerization is high and termination reactions involving radical-to-radical coupling, for instance, tend to occur, hence radical polymerization is generally regarded as difficult to control. Unlike the polymerization methods mentioned above, however, "living radical polymerization methods" have the following characteristic features, in spite of their consisting in radical polymerization: namely, they hardly undergo side reactions, such as termination reactions, and can give polymers with a narrow molecular weight distribution (Mw/Mn being about 1.1 to 1.5) and make it possible to arbitrarily control the molecular weight by changing the monomer-to-initiator charge ratio.

Therefore, such "living radical polymerization methods" are more preferred as the methods of producing the specific functional group-containing vinyl polymers mentioned above, since they can give polymers narrow in molecular weight distribution and low in viscosity and, in addition, make it possible to introduce specific functional group-containing monomers into the polymers at almost arbitrary positions.

The term "living polymerization", in its narrow sense, means a mode of polymerization in which molecular chains grows while their terminus always retain activity. In the ordinary sense, however, the term also includes the mode of pseudo-living polymerization in which molecular chains grow while terminally inactivated ones and terminally activated ones are in equilibrium. The latter definition applies also in the present invention.

In recent years, "living radical polymerization methods" have actively been studied by a number of groups of researchers. For example, there may be mentioned the one using a cobalt porphyrin complex, as described in the Journal of the American Chemical Society (J. Am. Chem. Soc.), 1994, vol. 116, page 7943, the one using a radical capping agent, such as a nitroxide compound, as described in Macromolecules, 1994, vol. 27, page 7228, and "atom transfer radical polymerization" (ATRP) using an organic halide or the like as an initiator and a transition metal complex as a catalyst.

Among the "living radical polymerization methods", the "atom transfer radical polymerization", by which vinyl monomers are polymerized using an organic halide or halogenated sulfonyl compound, among others, as an initiator and a transition metal complex as a catalyst, are more preferred as the method of producing specific functional group-containing vinyl polymers, since it not only has the characteristic features of "living radical polymerization" but also gives polymers having a terminal halogen atom and the like relatively convenient for functional group conversion reactions and, further, the degree of freedom is large in initiator and catalyst designing. As examples of this atom transfer radical polymerization, there may be mentioned those described in Matyjaszewski et al.: the Journal of the American Chemical Society (J. Am. Chem. Soc.), 1995, vol. 117, page 5614, Macromolecules, 1995, vol. 28, page 7901, Science, 1996, vol. 272, page 866, WO 96/30421, WO 97/18247, WO 98/01480, WO 98/40415, Sawamoto et al.: Macromolecules, 1995, vol. 28, page 1721, Japanese Kokai Publication Hei-09-208616 and Japanese Kokai Publication Hei-08-41117, among others.

The atom transfer radical polymerization to be used in the practice of the invention also includes the so-called reverse atom transfer radical polymerization. The reverse atom transfer radical polymerization is a technique comprising creating its high oxidation state when an ordinary atom transfer radical polymerization catalyst generates radicals, for example, an equilibrium state similar to the state in atom transfer radical polymerization by reacting Cu(II) when Cu(I) is used as the catalyst with an ordinary radical initiator, such as a peroxide. (cf. Macromolecules, 1999, 32, 2872).

Which of such living radical polymerization methods is to be used is not critical in the practice of the present invention. Preferred, however, is the atom transfer radical polymerization.

In the following, this living radical polymerization is described in detail.

The living radical polymerization is now described.

First, an explanation is made of the technique which uses a radical capping agent such as a nitroxide compound. In this polymerization, a nitroxy free radical (=N—O.), which is generally stable, is used as a radical capping agent. Such compound includes, as preferred species, but is not limited to, 2,2,6,6-tetrasubstituted-1-piperidinyloxy radicals, 2,2,5,5-tetrasubstituted-1-pyrrolidinyloxy radicals and like cyclic hydroxyamine-derived nitroxy free radicals. Suitable as the substituent are alkyl groups containing not more than 4 carbon atoms, such as methyl or ethyl group.

Specific nitroxy free radical compounds include, but are not limited to, 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-t-butylamine-oxy radical. It is also possible to use other stable free radicals, such as galvinoxyl free radical, in lieu of nitroxy free radicals.

The above radical capping agent is used in combination with a radical generator. Presumably, a reaction product formed from the radical capping agent and radical generator serves as a polymerization initiator to allow the polymerization of addition-polymerizable monomers to proceed. Although the ratio between both is not particularly restricted, the radical initiator is used appropriately in an amount of 0.1 to 10 moles per mole of the radical capping agent.

While various compounds can be used as the radical generator, a peroxide capable of generating a radical under polymerization temperature conditions is preferred. Such peroxide includes, but is not limited to, diacyl peroxides such as benzoyl peroxide and lauroyl peroxide, dialkyl peroxides such as dicumyl peroxide and di-tert-butyl peroxide, peroxycarbonates such as diisopropyl peroxydicarbonate and bis(4-t-butylcyclohexyl) peroxydicarbonate, and alkyl peresters such as t-butyl peroxyoctoate and t-butyl peroxybenzoate. In particular, benzoyl peroxide is preferred. Further, other radical generators, for example radical-generating azo compounds such as azobisisobutyronitrile can also be used in lieu of peroxides.

Alkoxyamine compounds such as those illustrated below may be used as initiators in lieu of the combined use of a radical capping agent and a radical generator, as reported in Macromolecules, 1995, vol. 28, page 2993.

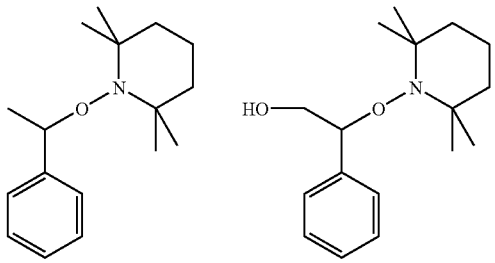

When an alkoxyamine compound is used as an initiator and that compound is one having a functional group such as a hydroxyl group, such as the one illustrated above, functional group-terminated polymers are obtained. When this is utilized in the practice of the present invention, functional group-terminated polymers can be obtained.

The polymerization conditions, including monomer(s), solvent and polymerization temperature, to be used in the above-mentioned polymerization using a radical capping agent such as a nitroxide compound are not particularly restricted but may be the same as those used in the atom transfer radical polymerization mentioned below.

Atom Transfer Radical Polymerization

Now, the atom transfer radical polymerization method, which is more preferred as the living radical polymerization in carrying out the present invention is described.

In this atom transfer radical polymerization, an organic halide, in particular a highly reactive carbon-halogen bond-containing organic halide (e.g. a carbonyl compound having a halogen at an α-position or a compound having a halogen at a benzyl position), a halogenated sulfonyl compound or the like is used as an initiator. Specific examples are as follows:

$C_6H_5$—$CH_2X$, $C_6H_5$—$C(H)(X)CH_3$, $C_6H_5$—$C(X)(CH_3)_2$ (in each formula, $C_6H_5$ is a phenyl group and X is a chlorine, bromine or iodine atom);

$R^3$—$C(H)(X)$—$CO_2R^4$, $R^3$—$C(CH_3)(X)$—$CO_2R^4$, $R^3$—$C(H)(X)$—$C(O)R^4$, $R^3$—$C(CH_3)(X)$—$C(O)R^4$ (in each formula, $R^3$ and $R^4$ each is a hydrogen atom or an alkyl, aryl or aralkyl group containing 1 to 20 carbon atoms and X is a chlorine, bromine or iodine atom);

$R^3$—$C_6H_4$—$SO_2X$ (in the above formula, $R^3$ is a hydrogen atom or an alkyl, aryl or aralkyl group containing 1 to 20 carbon atoms and X is a chlorine, bromine or iodine atom); and the like.

By carrying out the atom transfer radical polymerization of a vinyl monomer(s) using an organic halide or halogenated sulfonyl compound as the initiator, it is possible to obtain vinyl polymers having a terminal structure represented by the general formula (1):

—$C(R^1)(R^2)(X)$ (1)

(wherein $R^1$ and $R^2$ each represents a group bound to an ethylenically unsaturated group of the vinyl monomer and X represents a chlorine, bromine or iodine atom.)

An organic halide or halogenated sulfonyl compound having a specific functional group incapable of initiating the polymerization in addition to the functional group for initiating the polymerization may also be used as the initiator in atom transfer radical polymerization. In such case, vinyl polymers having the specific functional group at one main chain terminus and the terminal structure of general formula (1) at the other main chain terminus are produced. As such specific functional group, there may be mentioned alkenyl, crosslinking silyl, hydroxyl, epoxy, amino and amide groups, among others.

The alkenyl group-containing organic halide is not particularly restricted but includes, among others, those having a structure represented by the general formula (2):

$R^6R^7C(X)$—$R^8$—$R^9$—$C(R^5)$=$CH_2$ (2)

(wherein $R^5$ is a hydrogen atom or a methyl group, $R^6$ and $R^7$ each is a hydrogen atom or a univalent alkyl, aryl or aralkyl group containing 1 to 20 carbon atoms and such $R^6$ and $R^7$ groups may be bonded together at the respective other ends, $R^8$ is —C(O)O— (ester group), —C(O)— (keto group) or an o-, m- or p-phenylene group, $R^9$ is a direct bond or a divalent organic group containing 1 to 20 carbon atoms, which may contain one or more ether bonds, and X is a chlorine, bromine or iodine atom.)

As specific examples of the substituent $R^6$ and $R^7$, there may be mentioned a hydrogen atom, and methyl, ethyl, n-propyl, isopropyl, butyl, pentyl, hexyl and like groups. $R^6$ and $R^7$ may be connected to each other at the respective other ends to form a cyclic skeleton.

As specific examples of the alkenyl-containing organic halide represented by the general formula (2), there may be mentioned the following:

$XCH_2C(O)O(CH_2)_nCH$=$CH_2$, $H_3CC(H)(X)C(O)O(CH_2)_nCH$=$CH_2$, $(H_3C)_2C(X)C(O)O(CH_2)_nCH$=$CH_2$, $CH_3CH_2C(H)(X)C(O)O(CH_2)_nCH$=$CH_2$,

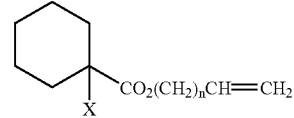

(in each formula, X is a chlorine, bromine or iodine atom and n is an integer of 0 to 20);

$XCH_2C(O)O(CH_2)_nO(CH_2)_mCH$=$CH_2$, $H_3CC(H)(X)C(O)O(CH_2)_nO(CH_2)_mCH$=$CH_2$, $(H_3C)_2C(X)C(O)O(CH_2)_nO(CH_2)_mCH$=$CH_2$, $CH_3CH_2C(H)(X)C(O)O(CH_2)_nO(CH_2)_mCH$=$CH_2$,

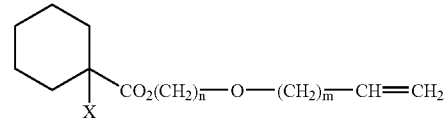

(in each formula, X is a chlorine, bromine or iodine atom, n is an integer of 1 to 20 and m is an integer of 0 to 20);

o-, m-, p-$XCH_2$—$C_6H_4$—$(CH_2)_n$—$CH$=$CH_2$, o-, m-, p-$CH_3C(H)(X)$—$C_6H_4$—$(CH_2)_n$—$CH$=$CH_2$, o-, m-, p-$CH_3CH_2C(H)(X)$—$C_6H_4$—$(CH_2)_n$—$CH$=$CH_2$ (in each formula, X is a chlorine, bromine or iodine atom and n is an integer of 0 to 20);

o-, m-, p-XCH$_2$—C$_6$H$_4$—(CH$_2$)$_n$—O—(CH$_2$)$_m$—CH═CH$_2$, o-, m-, p-CH$_3$C(H)(X)—C$_6$H$_4$—(CH$_2$)$_n$—O—(CH$_2$)$_m$—CH═CH$_2$, o-, m-, p-CH$_3$CH$_2$C(H)(X)—C$_6$H$_4$—(CH$_2$)$_n$—O—(CH2)$_m$—CH═CH$_2$ (in each formula, X is a chlorine, bromine or iodine atom, n is an integer of 1 to 20 and m is an integer of 0 to 20);

o-, m-, p-XCH$_2$—C$_6$H$_4$—O—(CH$_2$)$_n$—CH═CH$_2$, o-, m-, p-CH$_3$C(H)(X)—C$_6$H$_4$—O—(CH$_2$)$_n$—CH═CH$_2$, o-, m-, p-CH$_3$CH$_2$C(H)(X)—C$_6$H$_4$—O—(CH$_2$)$_n$—CH═CH$_2$ (in each formula, X is a chlorine, bromine or iodine atom and n is an integer of 0 to 20);

o-, m-, p-XCH$_2$—C$_6$H$_4$—O—(CH$_2$)$_n$—O—(CH$_2$)$_m$—CH═CH$_2$, o-, m-, p-CH$_3$C(H)(X)—C$_6$H$_4$—O—(CH$_2$)$_n$—O—(CH$_2$)$_m$—CH═CH$_2$, o-, m-, p-CH$_3$CH$_2$C(H)(X)—C$_6$H$_4$—O—(CH$_2$)$_n$—(CH$_2$)$_m$—CH═CH$_2$ (in each formula, X is a chlorine, bromine or iodine atom, n is an integer of 1 to 20 and m is an integer of 0 to 20).

As the alkenyl-containing organic halide, there may further be mentioned compounds represented by the general formula (3):

$$H_2C=C(R^5)-R^9-C(R^6)(X)-R^{10}-R^7 \quad (3)$$

(wherein $R^5$, $R^6$, $R^7$, $R^9$ and X are as defined above and $R^{10}$ represents a direct bond, —C(O)O— (ester group), —C(O)— (keto group) or an o-, m-or p-phenylene group).

$R^8$ is a direct bond or a divalent organic group (which may contain one or more ether bonds) containing 1 to 20 carbon atoms. When it is a direct bond, a vinyl group is bound to the carbon atom to which a halogen is bound, whereby an allyl halide compound is formed. In this case, the carbon-halogen bond is activated by the neighboring vinyl group, so that $R^{10}$ is not always required to be a C(O)O or phenylene group, for instance, but may be a direct bond. When $R^9$ is other than a direct bond, $R^{10}$ should preferably be a C(O)O, C(O) or phenylene group so that the carbon-halogen bond may be activated.

Specific examples of the compound of general formula (3) are as follows:

CH$_2$═CHCH$_2$X, CH$_2$═C(CH$_3$)CH$_2$X, CH$_2$═CHC(H)(X)CH$_3$, CH$_2$═C(CH$_3$)C(H)(X)CH$_3$, CH$_2$═CHC(X)(CH$_3$)$_2$, CH$_2$═CHC(H)(X)C$_2$H$_5$, CH$_2$═CHC(H)(X)CH(CH$_3$)$_2$, CH$_2$═CHC(H)(X)C$_6$H$_5$, CH$_2$═CHC(H)(X)CH$_2$C$_6$H$_5$, CH$_2$═CHCH$_2$C(H)(X)—CO$_2$R, CH$_2$═CH(CH$_2$)$_2$C(H)(X)—CO$_2$R, CH$_2$═CH(CH$_2$)$_3$C(H)(X)—CO$_2$R, CH$_2$═CH(CH$_2$)$_8$C(H)(X)—CO$_2$R, CH$_2$═CHCH$_2$C(H)(X)—C$_6$H$_5$, CH$_2$═CH(CH$_2$)$_2$C(H)(X)—C$_6$H$_5$, CH$_2$═CH(CH$_2$)$_3$C(H)(X)—C$_6$H$_5$ (in each of the above formulas, X is a chlorine, bromine or iodine atom and R is an alkyl, aryl or aralkyl group containing 1 to 20 carbon atoms), etc.

The following may be mentioned as specific examples of the alkenyl-containing halogenated sulfonyl compound:

o-, m-, p-CH$_2$═CH—(CH$_2$)$_n$—C$_6$H$_4$—SO$_2$X, o-, m-, p-CH$_2$═CH—(CH$_2$)—O—C$_6$H$_4$—SO$_2$X (in each formula, X is a chlorine, bromine or iodine atom and n is an integer of 0 to 20); etc.

The above-mentioned crosslinking silyl-containing organic halide is not particularly restricted but includes, among others, compounds having a structure represented by the general formula (4):

$$R^6R^7C(X)-R^8-R^9-C(H)(R^5)-CH_2-[Si(R^{11})_{2-b}(Y)_bO]_m-Si(R^{12})_{3-a}(Y)_a \quad (4)$$

(wherein $R^5$, $R^6$, $R^7$, $R^8$, $R^9$ and X are as defined above, $R^{11}$ and $R^{12}$ each represents an alkyl, aryl or aralkyl group containing 1 to 20 carbon atoms or a triorganosiloxy group represented by (R')$_3$SiO— (in which R' is a univalent hydrocarbon group containing 1 to 20 carbon atoms and the three R' groups may be the same or different) and, when there are two or more R' or $R^{12}$ groups, they may be the same or different; Y represents a hydroxyl group or a hydrolyzable group and, when there are two or more Y groups, they may be the same or different; a represents 0, 1, 2 or 3, b represents 0, 1 or 2, and m is an integer of 0 to 19 provided that the relation a+mb≧1 is satisfied).

Specific examples of the compound of general formula (4) are as follows:

XCH$_2$C(O)O(CH$_2$)$_n$Si(OCH$_3$)$_3$, CH$_3$C(H)(X)C(O)O(CH$_2$)$_n$Si(OCH$_3$)$_3$, (CH$_3$)$_2$C(X)C(O)O(CH$_2$)$_n$Si(OCH$_3$)$_3$, XCH$_2$C(O)O(CH$_2$)$_n$Si(CH$_3$)(OCH$_3$)$_2$, CH$_3$C(H)(X)C(O)O(CH$_2$)$_n$Si(CH$_3$)(OCH$_3$)$_2$, (CH$_3$)$_2$C(X)C(O)O(CH$_2$)$_n$Si(CH$_3$)(OCH$_3$)$_2$ (in each of the above formulas, X is a chlorine, bromine or iodine atom and n is an integer of 0 to 20);

XCH$_2$C(O)O(CH$_2$)$_n$O(CH$_2$)$_m$Si(OCH$_3$)$_3$, H$_3$CC(H)(X)C(O)O(CH$_2$)$_n$O(CH$_2$)$_m$Si(OCH$_3$)$_3$, (H$_3$C)$_2$C(X)C(O)O(CH$_2$)$_n$O(CH$_2$)$_m$Si(OCH$_3$)$_3$, CH$_3$CH$_2$C(H)(X)C(O)O(CH$_2$)$_n$O(CH$_2$)$_m$Si(OCH$_3$)$_3$, XCH$_2$C(O)O(CH$_2$)$_n$O(CH$_2$)$_m$Si(CH$_3$)(OCH$_3$)$_2$, H$_3$CC(H)(X)C(O)O(CH$_2$)$_n$O(CH$_2$)$_m$—Si(CH$_3$)(OCH$_3$)$_2$, (H$_3$C)$_2$C(X)C(O)O(CH$_2$)$_n$O(CH$_2$)$_m$—Si(CH$_3$)(OCH$_3$)$_2$, CH$_3$CH$_2$C(H)(X)C(O)O(CH$_2$)$_n$O(CH$_2$)$_m$—Si(CH$_3$)(OCH$_3$)$_2$ (in each of the above formulas, X is a chlorine, bromine or iodine atom, n is an integer of 1 to 20 and m is an integer of 0 to 20);

o-, m-, p-XCH$_2$—C$_6$H$_4$—(CH$_2$)$_2$Si(OCH$_3$)$_3$, o-, m-, p-CH$_3$C(H)(X)—C$_6$H$_4$—(CH$_2$)$_2$Si(OCH$_3$)$_3$, o-, m-, p-CH$_3$CH$_2$C(H)(X)—C$_6$H$_4$—(CH$_2$)$_2$Si(OCH$_3$)$_3$, o-, m-, p-XCH$_2$—C$_6$H$_4$—(CH$_2$)$_3$Si(OCH$_3$)$_3$, o-, m-, p-CH$_3$C(H)(X)—C$_6$H$_4$—(CH$_2$)$_3$Si(OCH$_3$)$_3$, o-, m-, p-CH$_3$CH$_2$C(H)(X)—C$_6$H$_4$—(CH$_2$)$_3$Si(OCH$_3$)$_3$, o-, m-, p-XCH$_2$—C$_6$H$_4$—(CH$_2$)$_2$—O—(CH$_2$)$_3$Si(OCH$_3$)$_3$, o-, m-, p-CH$_3$C(H)(X)—C$_6$H$_4$—(CH$_2$)$_2$—O—(CH$_2$)$_3$Si(OCH$_3$)$_3$, o-, m-, p-CH$_3$CH$_2$C(H)(X)—C$_6$H$_4$—(CH$_2$)$_2$—O—(CH$_2$)$_3$Si(OCH$_3$)$_3$, o-, m-, p-XCH$_2$—C$_6$H$_4$—O—(CH$_2$)$_3$Si(OCH$_3$) o-, m-, p-CH$_3$C(H)(X)—C$_6$H$_4$—O—(CH$_2$)$_3$Si(OCH$_3$)$_3$, o-, m-, p-CH$_3$CH$_2$C(H)(X)—C$_6$H$_4$—O—(CH$_2$)$_3$—Si(OCH$_3$) o-, m-, p-XCH$_2$—C$_6$H$_4$—O—(CH$_2$)$_2$—O—(CH$_2$)$_3$—Si(OCH$_3$)$_3$, o-, m-, p-CH$_3$C(H)(X)—C$_6$H$_4$—O—(CH$_2$)$_2$—O—(CH$_2$)$_3$Si(OCH$_3$)$_3$, o-, m-, p-CH$_3$CH$_2$C(H)(X)—C$_6$H$_4$—O—(CH$_2$)—O—(CH$_2$)$_3$Si(OCH$_3$)$_3$ (in each of the above formulas, X is a chlorine, bromine or iodine atom); etc.

As further examples of the above-mentioned crosslinking silyl-containing organic halide, there may be mentioned compounds having a structure represented by the general formula (5):

$$(R^{12})_{3-a}(Y)_aSi-[OSi(R^{11})_{2-b}(Y)_b]_m-CH_2-C(H)(R^5)-R^9-C(R^6)(X)-R^{10}-R^7 \quad (5)$$

(wherein $R^5$, $R^6$, $R^7$, $R^9$, $R^{10}$, $R^{11}$, $R^{12}$ a, b, m, X and Y are as defined above).

Specific examples of such compound are as follows:

(CH$_3$O)$_3$SiCH$_2$CH$_2$C(H)(X)C$_6$H$_5$, (CH$_3$O)$_2$(CH$_3$)SiCH$_2$CH$_2$C(H)(X)C$_6$H$_5$, (CH$_3$O)$_3$Si(CH$_2$)$_2$C(H)(X)—

CO$_2$R, (CH$_3$O)$_2$(CH$_3$)Si(CH$_2$)$_2$C(H)(X)—CO$_2$R, (CH$_3$O)$_3$Si(CH$_2$)$_3$C(H)(X)—CO$_2$R, (CH$_3$O)$_2$(CH$_3$)Si(CH$_2$)$_3$C(H)(X)—CO$_2$R, (CH$_3$O)$_3$Si(CH$_2$)$_4$C(H)(X)—CO$_2$R, (CH$_3$O)$_2$(CH$_3$)Si(CH$_2$)$_4$C(H)(X)—CO$_2$R, (CH$_3$O)$_3$Si(CH$_2$)$_9$C(H)(X)—CO$_2$R, (CH$_3$O)$_2$(CH$_3$)Si(CH$_2$)$_9$C(H)(X)—CO$_2$R, (CH$_3$O)$_3$Si(CH$_2$)$_3$C(H)(X)—C$_6$H$_5$, (CH$_3$O)$_2$(CH$_3$)Si(CH$_2$)$_3$C(H)(X)—C$_6$H$_5$, (CH$_3$O)$_3$Si(CH$_2$)$_4$C(H)(X)—C$_6$H$_5$, (CH$_3$O)$_2$(CH$_3$)Si(CH$_2$)$_4$C(H)(X)—C$_6$H$_5$ (in each of the above formulas, X is a chlorine, bromine or iodine atom and R is an alkyl, aryl or aralkyl group containing 1 to 20 carbon atoms); etc.

The above-mentioned hydroxyl-containing organic halide or halogenated sulfonyl compound is not particularly restricted but includes, for example, the following:

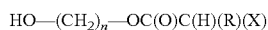
HO—(CH$_2$)$_n$—OC(O)C(H)(R)(X)

(wherein X is a chlorine, bromine or iodine atom, R is a hydrogen atom or an alkyl, aryl or aralkyl group containing 1 to 20 carbon atoms and n is an integer of 1 to 20).

The above-mentioned amino-containing organic halide or halogenated sulfonyl compound is not particularly restricted but includes, for example, the following:

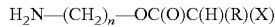
H$_2$N—(CH$_2$)$_n$—OC(O)C(H)(R)(X)

(wherein X is a chlorine, bromine or iodine atom, R is a hydrogen atom or an alkyl, aryl or aralkyl group containing 1 to 20 carbon atoms and n is an integer of 1 to 20).

The above-mentioned epoxy group-containing organic halide or halogenated sulfonyl compound is not particularly restricted but includes, for example, the following:

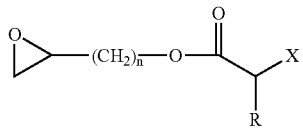

(wherein X is a chlorine, bromine or iodine atom, R is a hydrogen atom or an alkyl, aryl or aralkyl group containing 1 to 20 carbon atoms and n is an integer of 1 to 20).

For obtaining vinyl polymers having two or more terminal structures represented by the general formula (1) given above in each molecule, an organic halide or halogenated sulfonyl compound having two or more initiation sites is preferably used as the initiator. As specific examples, there may be mentioned the following:

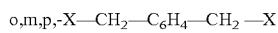
o,m,p,-X—CH$_2$—C$_6$H$_4$—CH$_2$—X

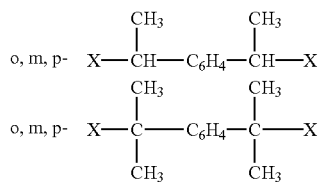

(in the above formulas, C$_6$H$_4$ is a phenylene group and X is a chlorine, bromine or iodine atom);

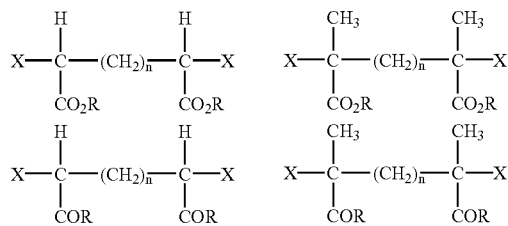

(in the above formulas, R is an alkyl, aryl or aralkyl group containing 1 to 20 carbon atoms, n is an integer of 0 to 20 and X is a chlorine, bromine or iodine atom);

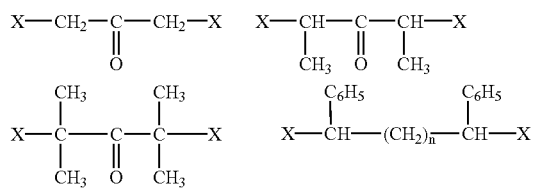

(in the above formulas, X is a chlorine, bromine or iodine atom and n is an integer of 0 to 20);

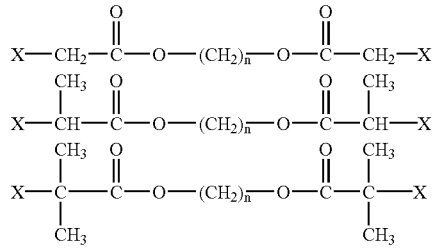

(in the above formulas, n is an integer of 1 to 20 and X is a chlorine, bromine or iodine atom);

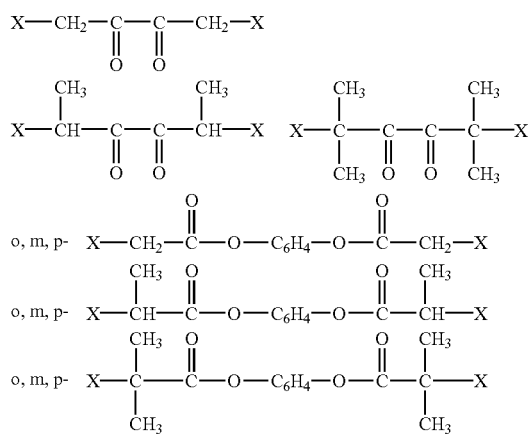

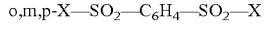
o,m,p-X—SO$_2$—C$_6$H$_4$—SO$_2$—X (in the above formulas, X is a chlorine, bromine or iodine atom); etc.

The vinyl monomers to be used in this polymerization are not particularly restricted but those monomers mentioned hereinabove as examples all can appropriately be used.

The transition metal complex to be used as the catalyst is not particularly restricted but preferably is a metal complex containing, as the central atom, an element of the group 7, 8, 9, 10 or 11 of the periodic table. More preferred are complexes of zero-valent copper, univalent copper, divalent ruthenium, divalent iron or divalent nickel. Copper complexes are preferred among others. Specific examples of the univalent copper compound to be used are cuprous chloride, cuprous bromide, cuprous iodide, cuprous cyanide, cuprous oxide and cuprous perchlorate. When such a copper compound is used, 2,2'-bipyridyl or a derivative thereof, 1,10-phenanthroline or a derivative thereof or a polyamine such as tetramethylethylenediamine, pentamethyldiethylenetriamine or hexamethyltris(2-aminoethyl)amine is added as a ligand for increasing the catalytic activity. The tristriphenylphosphine complex of divalent ruthenium chloride (RuCl$_2$(PPh$_3$)$_3$) is also suited for use as the catalyst. When such a ruthenium compound is used as the catalyst, an aluminum alkoxide is added as an activator. Furthermore, the divalent iron-bistriphenylphosphine complex (FeCl$_2$(PPh$_3$)$_2$), the divalent nickel-bistriphenylphosphine complex (NiCl$_2$(PPh$_3$)$_2$) and the divalent nickel-bistributylphosphine complex (NiBr$_2$(PBu$_3$)$_2$) are also suited for use as the catalyst.

The polymerization reaction can be carried out without using any solvent or in various solvents. The solvent species are not particularly restricted but mention may be made of hydrocarbon solvents such as benzene and toluene; ether solvents such as diethyl ether, tetrahydrofuran, diphenyl ether, anisole, and dimethoxybenzene; halogenated hydrocarbon solvents such as methylene chloride, chloroform, and chlorobenzene; ketone solvents such as acetone, methyl ethyl ketone, and methyl isobutyl ketone; alcohol solvents such as methanol, ethanol, propanol, isopropanol, n-butyl alcohol, and tert-butyl alcohol; nitrile solvents such as acetonitrile, propionitrile, and benzonitrile; ester solvents such as ethyl acetate and butyl acetate; carbonate solvents such as ethylene carbonate and propylene carbonate; amide solvents such as N,N-dimethylformamide and N,N-dimethylacetamide; and the like. These may be used singly or two or more of them may be used in combination. The polymerization can also be carried out in an emulsion system or in a system in which the supercritical fluid CO$_2$ is used as a medium.

The polymerization can be carried out within the temperature range of 0° C. to 200° C., preferably within the range of from room temperature to 150° C., although the temperature is not limited to such range.

<Hydrosilylatable Alkenyl Group>

Alkenyl Group

The hydrosilylatable alkenyl group to be used in the practice of the invention is not particularly restricted but preferably is one represented by the general formula (7):

$$H_2C=C(R^{13})— \qquad (7)$$

(wherein R$^{13}$ is a hydrogen atom or an organic group containing 1 to 20 carbon atoms).

In the general formula (7), R$^{13}$ is a hydrogen atom or an organic group containing 1 to 20 carbon atoms. The organic group containing 1 to 20 carbon atoms is not particularly restricted but preferably is an alkyl group containing 1 to 20 carbon atoms, an aryl group containing 6 to 20 carbon atoms or an aralkyl group containing 7 to 20 carbon atoms. Typical examples are as follows:

—(CH$_2$)$_n$—CH$_3$, —CH(CH$_3$)—(CH$_2$)$_n$—CH$_3$, —CH(CH$_2$CH$_3$)—(CH$_2$)$_n$—CH$_3$, —CH(CH$_2$CH$_3$)$_2$, —C(CH$_3$)$_2$—(CH$_2$)$_n$—CH$_3$, —C(CH$_3$)(CH$_2$CH$_3$)—(CH$_2$)$_n$—CH$_3$, —C$_6$H$_5$, —C$_6$H$_4$ (CH$_3$), —C$_6$H$_3$(CH$_3$)$_2$, —(CH$_2$)$_n$—C$_6$H$_5$, —(CH$_2$)$_n$—C$_6$H$_4$ (CH$_3$) —(CH$_2$)$_n$—C$_6$H$_3$ (CH$_3$)$_2$ (n being an integer of not less than 0 and the total number of carbon atoms in each group being not more than 20). Among these, a hydrogen atom or a methyl group is preferred as R$^{13}$.

It is preferred, though not obligatory, that the alkenyl group in the vinyl polymer (A) be not activated. Thus, it is preferred that the group be not conjugated with a carbonyl group, an alkenyl group or an aromatic ring, for instance.

The mode of bonding of the alkenyl group to the polymer main chain is not particularly restricted but preferably bonded by, for example, carbon-carbon bond, ester bond, ether bond, carbonate bond, amide bond, urethane bond or the like.

Number of Alkenyl Groups

The vinyl polymer (A) has, on an average, at least one alkenyl group capable of being hydrosilylated. From the viewpoint of the curability of the composition, the number of alkenyl groups is preferably more than 1, more preferably 1.1 to 4.0, still more preferably 1.5 to 3.0.

Position of Alkenyl Groups

When the curable composition of the invention is required to give curing products having rubber-like properties, in particular, it is preferred that at least one of the alkenyl groups occur at a molecular chain terminus, since the molecular weight between crosslinking points, which has a great influence on the rubber elasticity, can be increased. More preferably, the polymer has all alkenyl groups at a molecular chain termini.

Certain methods of producing the above vinyl polymer, in particular a (meth) acrylic polymer, having at least one alkenyl group at a molecular chain terminus are disclosed in Japanese Kokoku Publication Hei-03-14068, Japanese Kokoku Publication Hei-04-55444 and Japanese Kokai Publication Hei-06-211922, among others. However, these are free radical polymerization methods using the above-mentioned "chain transfer agent technique" and, therefore, the polymers obtained has the alkenyl group at a molecular chain terminus with a relatively high percentage. They have a problem, however; the molecular weight distribution represented by Mw/Mn is generally at least 2 and the viscosity becomes high. Therefore, for obtaining vinyl polymers having an alkenyl group at a molecular chain terminus at a high percentage and having a narrow molecular weight distribution and a low viscosity, the above-mentioned "living radical polymerization technique" is preferably used.

In the following, methods of alkenyl group introduction into the polymer molecule chain are described.

<Alkenyl Group Introduction Methods>

Typical methods of alkenyl group introduction are now described. They have no restrictive meaning, however.

As the methods of alkenyl group introduction, there may be mentioned, among others, the method comprising direct alkenyl group introduction in the polymerization reaction system, and the method comprising synthesizing a specific functional group-containing vinyl polymer and converting the specific functional group to an alkenyl group in one or several reaction steps. The following two methods can be mentioned as typical ones.

The first one is the method comprising (1) polymerizing a vinyl monomer(s) in the manner of atom transfer radical polymerization to produce a vinyl polymer having a terminal structure represented by the general formula (1):

(wherein $R^1$ and $R^2$ each represents a group bound to an ethylenically unsaturated group of the vinyl monomer and X represents a chlorine, bromine or iodine atom) (hereinafter also referred to as "vinyl polymer having at least one highly reactive carbon-halogen bond") and (2) converting the terminal halogen atom of the above polymer to a substituent having a hydrosilylatable alkenyl group.

The second one is the method comprising (1) polymerizing a vinyl monomer(s) in the manner of living radical polymerization to form a vinyl polymer molecular chain and (2) then reacting a compound having at least two low polymerizable alkenyl groups with the active terminus of the above polymer.

In the following, typical methods of alkenyl group introduction, (A-a) to (A-f), are described.

(A-a) Method comprising subjecting a compound having a polymerizable alkenyl group and a low polymerizable alkenyl group in each molecule, for example a compound represented by the general formula (9) given below, as a second monomer, to reaction on the occasion of synthesizing a vinyl polymer in the manner of radical polymerization, preferably living radical polymerization:

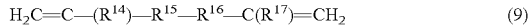

(in the formula, $R^{14}$ represents a hydrogen atom or a methyl group, $R^{15}$ represents —C(O)O— or o-, m-or p-phenylene group, $R^{16}$ represents a direct bond or a divalent organic group containing 1 to 20 carbon atoms, which may contain one or more ether bonds, and $R^{17}$ represents a hydrogen atom or an organic group containing 1 to 20 carbon atoms.)

In the general formula (9), $R^{17}$ is a hydrogen atom or an organic group containing 1 to 20 carbon atoms. The organic group containing 1 to 20 carbon atoms is not particularly restricted but preferably is an alkyl group containing 1 to 20 carbon atoms, an aryl group containing 6 to 20 carbon atoms or an aralkyl group containing 7 to 20 carbon atoms. Specific examples are as follows:

—$(CH_2)_n$—$CH_3$, —$CH(CH_3)$—$(CH_2)_n$—$CH_3$, —CH$(CH_2CH_3)$—$(CH_2)_n$—$CH_3$, —$CH(CH_2CH_3)_2$ —$C(CH_3)_2$ —$(CH_2)_n$—$CH_3$, —$C(CH_3)(CH_2CH_3)$—$(CH_2)_n$—$CH_3$, —$C_6H_5$, —$C_6H_4(CH_3)$, —$C_6H_3(CH_3)_2$, —$(CH_2)_n$— $C_6H_5$, —$(CH_2)_n$—$C_6H_4$ $(CH_3)$, —$(CH_2)_n$—$C_6H_3(CH_3)_2$ (n being an integer of not less than 0 and the total number of carbon atoms in each group being not more than 20).

Among these, a hydrogen atom or a methyl group is preferred as $R^{17}$.

The time when the compound having a polymerizable alkenyl group and a low polymerizable alkenyl group in each molecule is subjected to reaction is not particularly restricted but, in particular in living radical polymerization and when rubber-like properties are expected preferably, the compound is subjected to reaction as a second monomer preferably at the final stage of the polymerization or after completion of the reaction of the employed monomer.

(A-b) Method comprising subjecting a compound having at least two low polymerizable alkenyl groups, such as 1,5-hexadiene, 1,7-octadiene or 1,9-decadiene, to reaction on the occasion of synthesizing a vinyl polymer by living radical polymerization at the final stage of the polymerization reaction or after completion of the employed monomer.

(A-c) Method comprising reacting a vinyl polymer having at least one highly reactive carbon-halogen bond with one of various alkenyl group-containing organometallic compound, for example such an organotin compound as allyltributyltin or allyltrioctyltin, for substitution for the halogen.

(A-d) Method comprising reacting a vinyl polymer having at least one highly reactive carbon-halogen bond with an alkenyl group-containing stabilized carbanion, such as one represented by the general formula (10):

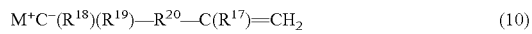

(wherein $R^{17}$ is as defined above, $R^{18}$ and $R^{19}$ each is an electron-withdrawing group capable of stabilizing the carbanion $C^-$ or one of them is such an electron-withdrawing group and the other represents a hydrogen atom, an alkyl group containing 1 to 10 carbon atoms or a phenyl group, $R^{20}$ represents a direct bond or a divalent organic group containing 1 to 10 carbon atoms, which may contain one or more ether bonds, and $M^+$ represents an alkali metal ion or a quaternary ammonium ion), for substitution for the halogen.

The electron-withdrawing group $R^{18}$ and/or $R^{19}$ includes —$CO_2R$ (ester group), —C(O)R (keto group), —$CON(R_2)$ (amide group), —COSR (thioester group), —CN (nitrile group), —$NO_2$ (nitro groups) and so on. Particularly preferred are —$CO_2R$, —C(O)R and —CN, however. The substituent R is an alkyl group containing 1 to 20 carbon atoms, an aryl group containing 6 to 20 carbon atoms or an aralkyl group containing 7 to 20 carbon atoms and preferably is an alkyl group containing 1 to 10 carbon atoms or a phenyl group.

(A-e) Method comprising reacting a vinyl polymer having at least one highly reactive carbon-halogen bond with a simple substance metal, such as zinc, or an organometallic compound and then reacting the thus-prepared enolate anion with an alkenyl-containing, electrophilic compound, such as an alkenyl-containing compound having a leaving group such as a halogen atom or an acetyl group, an alkenyl-containing carbonyl compound, an alkenyl-containing isocyanate compound or an alkenyl-containing acid halide.

(A-f) Method comprising reacting a vinyl polymer having at least one highly reactive carbon-halogen bond with an alkenyl-containing oxy anion or carboxylate anion such as one represented by the general formula (11) or (12), for substitution for the halogen:

(wherein $R^{17}$ and $M^+$ are as defined above and $R^{21}$ is a divalent organic group containing 1 to 20 carbon atoms, which may contain one or more ether bonds);

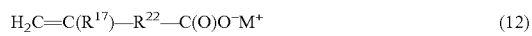

(wherein $R^{17}$ and $M^+$ are as defined above and $R^{22}$ is a direct bond or a divalent organic group containing 1 to 20 carbon atoms, which may contain one or more ether bonds).

In the practice of the present invention, when no halogen is directly involved in the alkenyl group introduction, as in the method (A-a) or (A-b), the living radical polymerization technique is preferred and the atom transfer radical polymerization technique is more preferred as the method of synthesizing the vinyl polymer.

In those methods which utilize a vinyl polymer having at least one highly reactive carbon-halogen bond, such as mentioned above under (A-c) to (A-f), the vinyl polymer having at least one highly reactive carbon-halogen bond is preferably synthesized by chain transfer polymerization using a halide as a chain transfer agent or by atom transfer radical polymerization using an organic halide or halogenated sulfonyl compound as an initiator, more preferably by atom transfer radical polymerization.

Among the methods (A-a) to (A-f), the methods (A-b) and (A-f) are preferred in view of easier controllability. The introduction methods (A-b) and (A-f) are described in the following in more detail.

Diene Compound Addition Method [Method (A-b)]

The method (A-b) is characterized in that a vinyl polymer obtained by living radical polymerization of a vinyl monomer(s) is reacted with a compound having at least two low polymerizable alkenyl groups (hereinafter referred to as "diene compound").

The two alkenyl groups of the diene compound may be the same or different from each other. Each alkenyl group may be a terminal alkenyl group [CH$_2$=(R)—R'; R is a hydrogen atom or an organic group containing 1 to 20 carbon atoms and R' is an organic group containing 1 to 20 carbon atoms; R and R' may be bound together to form a cyclic structure] or an internal alkenyl group [R'—C(R)=C(R)—R'; R is a hydrogen atom or an organic group containing 1 to 20 carbon atoms and R' is an organic group containing 1 to 20 carbon atoms; the two R groups, or the two R' groups, may be the same or different; any two of the two R and two R' groups may be bonded together to form a cyclic structure]. A terminal alkenyl group is preferred, however. R is a hydrogen atom or an organic group containing 1 to 20 carbon atoms. The organic group containing 1 to 20 carbon atoms is preferably an alkyl group containing 1 to 20 carbon atoms, an aryl group containing 6 to 20 carbon atoms or an aralkyl group containing 7 to 20 carbon atoms. Among these, a hydrogen atom or a methyl group is preferred as R.

Of the alkenyl groups of the diene compound, at least two alkenyl group may be conjugated.

As specific examples of the diene compound, there may be mentioned isoprene, piperylene, butadiene, myrcene, 1,5-hexadiene, 1,7-octadiene, 1,9-decadiene, 4-vinyl-1-cyclohexene and the like. Among them, 1,5-hexadiene, 1,7-octadiene and 1,9-decadiene are preferred.

It is also possible to obtain the desired alkenyl-terminated vinyl polymer by carrying out living radical polymerization of a vinyl monomer(s), isolating the resulting polymer from the polymerization system and reacting the thus-isolated polymer with a diene compound in the manner of radical reaction. According to a more preferred procedure, which is simple and easy to perform, the diene compound is added to the polymerization reaction system at the final stage of the polymerization reaction or after completion of the reaction of the vinyl monomer employed.

It is necessary that the level of addition of the diene compound be adjusted according to the radical reactivity of the alkenyl group of the diene compound. When there is a great difference in reactivity between the two alkenyl groups, the amount of the diene compound may be equivalent or in a slight excess relative to the growing polymerization termini. When there is no or little difference in reactivity between the two alkenyl groups, however, both the two alkenyl groups may react and polymerization termini may couple together, so that the diene compound is preferably added in excess, preferably 1.5 times, more preferably not less than 3 times, most preferably not less than 5 times, relative to the growing polymer termini.

Nucleophilic Substitution Method [Method (A-f)]

The method (A-f) is characterized in that a vinyl polymer having at least one highly reactive carbon-halogen bond is reacted with an alkenyl group-containing oxy anion or carboxylate anion for substitution for the halogen.

The alkenyl-containing oxy anion or carboxylate anion is not particularly restricted but includes, among others, those represented by the general formula (11) or (12):

$$H_2C=C(R^{17})-R^{21}-O^-M^+ \qquad (11)$$

(wherein R$^{17}$ and M$^+$ are as defined above and R$^{21}$ is a divalent organic group containing 1 to 20 carbon atoms, which may contain one or more ether bonds);

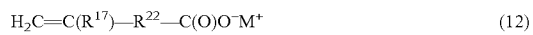
$$H_2C=C(R^{17})-R^{22}-C(O)O^-M^+ \qquad (12)$$

(wherein R$^{17}$ and M$^+$ are as defined above and R$^{22}$ is a direct bond or a divalent organic group containing 1 to 20 carbon atoms, which may contain one or more ether bonds).

As specific examples of the oxy anion or carboxylate anion, there may be mentioned, among others, metal salts or quaternary ammonium salts of alkenyl alcohols such as allyl alcohol; metals salts or quaternary ammonium salts of allyloxy alcohols such as ethylene glycol monoallyl ether; metal salts or quaternary ammonium salts of alkenyl-containing phenolic hydroxyl groups such as allylphenol and allyloxyphenol; metal salts or quaternary ammonium salts of alkenyl-containing carboxylic acids such as 10-undecylenic acid, 4-pentenoic acid and vinylacetic acid; and so forth.

M$^+$ is the counter cation and, as for the species thereof, M$^+$ includes alkali metal ions, specifically the lithium ion, sodium ion and potassium ion, and quaternary ammonium ions. As the quaternary ammonium ions, there may be mentioned the tetramethylammonium ion, tetraethylammonium ion, tetrabenzylammonium ion, trimethyldodecylammonium ion, tetrabutylammonium ion and dimethylpiperidinium ion, etc. The sodium ion and potassium ion are preferred, however.

The oxy anion or carboxylate anion may be used in excess relative to the halogen, preferably in an amount of 1 to 5 equivalents, more preferably 1 to 2 equivalents, still more preferably 1.0 to 1.2 equivalents, relative to the halogen.

The solvent to be used in carrying out this reaction is not particularly restricted but preferably is a solvent relatively high in polarity. Thus, for example, there may be mentioned ether solvents such as diethyl ether, tetrahydrofuran, diphenyl ether, anisole and dimethoxybenzene; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; amide solvents such as dimethylformamide and dimethylacetamide; sulfoxide solvents such as dimethyl sulfoxide; etc. These may be used singly or two or more of them may be used in admixture. Among them, such polar solvents as acetone, dimethyl sulfoxide, dimethylformamide, dimethylacetamide, hexamethylphosphoric triamide and acetonitrile are preferred.

The reaction temperature is not particularly restricted but, generally, it is 0 to 150° C., preferably room temperature to 100° C.

An amine, ammonium salt or crown ether, for instance, may be added to the reaction system as a reaction promoter.

In lieu of an oxy anion or carboxylate anion, an alcohol or carboxylic acid, which is a precursor, may be reacted with a base in the reaction system for preparing the corresponding oxy anion or carboxylate anion.

When an ester group occurs on side chains or in the main chain of the vinyl polymer, the use of an oxy anion, which is highly nucleophilic, may lead to occurrence of transesterification and, therefore, the use of a carboxylate anion, which is low in nucleophilicity, is more preferred.

Methods of Converting a Hydroxyl Group to an Alkenyl Group

It is also possible to obtain the vinyl polymer having at least one alkenyl group from a vinyl polymer having at least one hydroxyl group. Utilizable methods include, but are not limited to, the following.

(A-g) Method comprising reacting a vinyl polymer having at least one hydroxyl group with a base, such as sodium methoxide, followed by reaction with an alkenyl-containing halide, such as allyl chloride.

(A-h) Method comprising reacting a vinyl polymer having at least one hydroxyl group with an alkenyl-containing isocyanate compound, such as allyl isocyanate.

(A-i) Method comprising reacting a vinyl polymer having at least one hydroxyl group with an alkenyl-containing acid halide, such as (meth) acrylic acid chloride, in the presence of a base, such as pyridine.

(A-j) Method comprising reacting a vinyl polymer having at least one hydroxyl group with an alkenyl-containing carboxylic acid, such as acrylic acid, in the presence of an acid catalyst.

(A-k) Method comprising reacting a vinyl polymer having at least one hydroxyl group with a diisocyanate compound and then reacting the remaining isocyanato group with a compound having both an alkenyl group and a hydroxyl group.

The compound having both an alkenyl group and a hydroxyl group is not particularly restricted but includes, among others, alkenyl alcohols such as 10-undecenol, 5-hexenol and allyl alcohol.

The diisocyanate compound is not particularly restricted but may be any of those known in the art, for example toluylene diisocyanate, 4,4'-diphenylmethanediisocyanate, hexamethylene diisocyanate, xylylene diisocyanate, met-axylylene diisocyanate, 1,5-naphthalenediisocyanate, hydrogenated diphenylmethanediisocyanate, hydrogenated toluylene diisocyanate, hydrogenated xylylene diisocyanate, isophoronediisocyanate, and like isocyanate compounds. These may be used singly or two or more of them may be used in combination. These may also be used in the form of block isocyanates. For making better use of the excellent weatherability, the use of aromatic ring-free diisocyanate compounds such as hexamethylene diisocyanate and hydrogenated diphenylmethanediisocyanate is preferred.

Methods of Synthesizing Hydroxyl-Containing Vinyl Polymers

The method of producing the vinyl polymer having at least one hydroxyl group, which polymer is to be used in the methods (A-g) to (A-j), includes, but is not limited to, the following method described in (B-a) to (B-j), among others.

(B-a) Method comprising subjecting to reaction, as a second monomer, a compound having both a polymerizable alkenyl group and a hydroxyl group in each molecule, for example one represented by the general formula (15) given below, in synthesizing the vinyl polymer by radical polymerization:

$$H_2C=C(R^{14})-R^{15}-R^{16}-OH \quad (15)$$

(wherein $R^{14}$, $R^{15}$ and $R^{16}$ are as defined above)

The time for subjecting to reaction the compound having both a polymerizable alkenyl group and a hydroxyl group in each molecule is not critical but, in particular in living radical polymerization, when rubber-like properties are demanded, the compound is preferably subjected to reaction as a second monomer at the final stage of the polymerization reaction or after completion of the reaction of the employed monomer.

(B-b) Method comprising subjecting an alkenyl alcohol, such as 10-undecenol, 5-hexenol or allyl alcohol, to reaction at the final stage of polymerization reaction or after completion of the reaction of the employed monomer in synthesizing the vinyl polymer by living radical polymerization.

(B-c) Method comprising radical-polymerizing a vinyl monomer(s) using a hydroxyl-containing chain transfer agent, such as a hydroxyl-containing polysulfide, in large amounts, as described in Japanese Kokai Publication Hei-05-262808, for instance.

(B-d) Method comprising subjecting a vinyl monomer(s) to radical polymerization using hydrogen peroxide or a hydroxyl-containing initiator, as described in Japanese Kokai Publication Hei-06-239912 and Japanese Kokai Publication Hei-08-283310, for instance.

(B-e) Method comprising subjecting a vinyl monomer(s) to radical polymerization using an alcohol in excess, as described in Japanese Kokai Publication Hei-06-116312, for instance.

(B-f) Method comprising introducing a terminal hydroxyl group by hydrolyzing the halogen atom of a vinyl polymer having at least one highly reactive carbon-halogen bond or reacting such halogen atom with a hydroxyl-containing compound, according to the method described in Japanese Kokai Publication Hei-04-132706, for instance.

(B-g) Method comprising reacting a vinyl polymer having at least one highly reactive carbon-halogen bond with a hydroxyl-containing stabilized carbanion, such as one represented by the general formula (16), for substitution for the halogen atom:

$$M^+C^-(R^{18})(R^{19})-R^{20}-OH \quad (16)$$

(wherein $R^{18}$, $R^{19}$ and $R^{20}$ are as defined above).

The electron-withdrawing groups $R^{18}$ and $R^{19}$ include —$CO_2R$ (ester group), —C(O)R (keto group), —CON($R_2$) (amide group), —COSR (thioester group), —CN (nitrile group) and —$NO_2$ (nitro group), among others. Particularly preferred are —$CO_2R$, —C(O)R and —CN, however. The substituent R is an alkyl group containing 1 to 20 carbon atoms, an aryl group containing 6 to 20 carbon atoms or an aralkyl group containing 7 to 20 carbon atoms, preferably an alkyl group containing 1 to 10 carbon atoms or a phenyl group.

(B-h) Method comprising reacting a vinyl polymer having at least one highly reactive carbon-halogen bond with a simple substance metal, such as zinc, or an organometallic compound and then reacting the thus-prepared enolate anion with an aldehyde or ketone.

(B-i) Method comprising reacting a vinyl polymer having at least one highly reactive carbon-halogen bond with a hydroxyl-containing oxy anion or carboxylate anion, such as one represented by the general formula (17) or (18) given below, for substitution for the halogen atom:

(wherein $R^{21}$ and $M^+$ are as defined above);

(wherein $R^{22}$ and $M^+$ are as defined above)

As for the $M^+$, reaction conditions, solvent and so on, those described with respect to (A-f) can appropriately be employed.

(B-j) Method comprising subjecting, as a second monomer, a compound having a low polymerizable alkenyl group and a hydroxyl group in each molecule to reaction at the final stage of the polymerization reaction or after completion of the reaction of the employed monomer in synthesizing the vinyl polymer by living radical polymerization.

Such compound is not particularly restricted but may be a compound represented by the general formula (19), for instance:

(wherein $R^{14}$ and $R^{21}$ are as defined above).

The compound represented by the above general formula (19) is not particularly restricted but, in view of ready availability, alkenyl alcohols such as 10-undecenol, 5-hexenol and allyl alcohol are preferred.

In the practice of the present invention, when no halogen is directly involved in hydroxyl group introduction, as in the methods (B-a) to (B-e) and (B-j), living radical polymerization is preferred, and atom transfer radical polymerization is more preferred, as the method of synthesizing the vinyl polymer.

In those methods which utilize a vinyl polymer having at least one highly reactive carbon-halogen bond, such as in the methods (B-f) to (B-i), the vinyl polymer having at least one highly reactive carbon-halogen bond is preferably synthesized by chain transfer polymerization using a halide as a chain transfer agent or atom transfer radical polymerization using an organic halide or halogenated sulfonyl compound as an initiator, more preferably by atom transfer radical polymerization.

Among the synthetic methods (B-a) to (B-j), the methods (B-b) and (B-i) are preferred because of easier controllability.

<<Re: Hydrosilyl Group-Containing Compound (B)>>

The hydrosilyl group-containing compound, which is the (B) component, is not particularly restricted but may be any of those hydrosilyl-containing compounds capable of reacting with the (A) component, namely the vinyl polymer having at least one alkenyl group, to cause crosslinking and curing. Preferred are organohydrogenpolysiloxanes.

The hydrosilyl-containing compound (B) has, on an average, at least one, preferably 1.1 to 5.0, more preferably 1.5 to 3.0 hydrosilyl groups in each molecule.

Specifically, use may be made, for example, of linear polysiloxanes represented by the general formula (22) or (23):

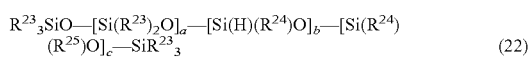

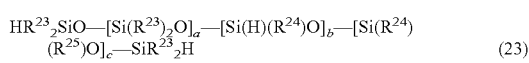

(wherein $R^{23}$ and $R^{24}$ each represents an alkyl group containing 1 to 6 carbon atoms or a phenyl group, R represents an alkyl group or aralkyl group containing up to 10 carbon atoms, and a, b and c each represents an integer satisfying the relation $0 \leq a \leq 100$, $2 \leq b \leq 100$ and $0 \leq c \leq 100$);

cyclic siloxanes represented by the general formula (24):

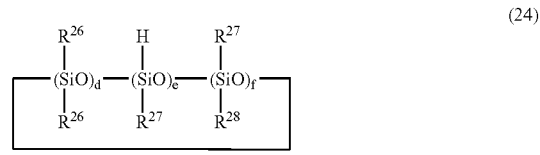

(wherein $R^{26}$ and $R^{27}$ each represents an alkyl group containing 1 to 6 carbon atoms or a phenyl group, R28 represents an alkyl group or aralkyl group containing up to 10 carbon atoms, and d, e and f each represents an integer satisfying the relation $0 \leq d \leq 8$, $2 \leq e \leq 10$ or $0 \leq f \leq 8$ provided that the relation $3 \leq d+e+f \leq 10$ should be satisfied); and so forth. These may be used singly or two or more of them may be used in admixture.

Among these siloxanes, phenyl-containing linear siloxanes represented by the general formula (25) or (26) shown below and cyclic siloxanes represented by the general formula (27) or (28) given below are preferred from the viewpoint of compatibility with the vinyl polymer (A), in particular (meth)acrylic polymers.

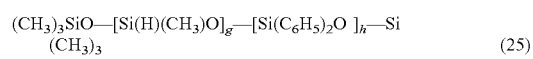

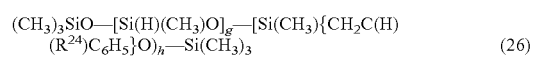

(in the above formulas, $R^{24}$ represents a hydrogen atom or a methyl group, g and h each represents an integer satisfying the relation $2 \leq g \leq 100$ and $0 \leq h \leq 100$, and $C_6H_5$ represents a phenyl group.)

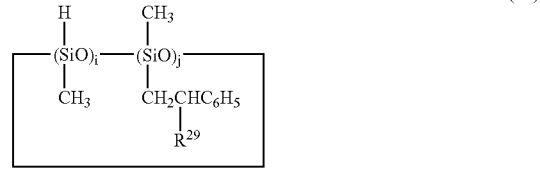

(in the above formulas, $R^{29}$ represents a hydrogen atom or a methyl group, i and j each represents an integer satisfying the relation $2 \leq i \leq 10$ or $0 \leq j \leq 8$ with the condition $3 \leq i+j \leq 10$, and $C_6H_5$ represents a phenyl group.)

Further usable as the hydrosilyl-containing compound, which is the (B) component, are compounds obtained by subjecting a low-molecular-weight compound having two or more alkenyl groups in each molecule and a hydrosilyl-containing compound represented by any of the general formulas (22) to (28) to addition reaction in a manner such that the hydrosilyl group partially remains even after reaction.

Usable as the compound having two or more alkenyl groups in the molecule are various compounds. Examples are hydrocarbon compounds such as 1,4-pentadiene, 1,5-hexadiene, 1,6-heptadiene, 1,7-octadiene, 1,8-nonadiene and 1,9-decadiene, ether compounds such as O,O'-diallylbisphenol A and 3,3,'-diallylbisphenol A, ester compounds such as diallyl phthalate, diallyl isophthalate, triallyl trimellitate and tetraallyl pyromellitate, and carbonate compounds such as diethylene glycol diallyl carbonate.

The above compounds can be obtained by slowly adding dropwise the compound containing at least two alkenyl group to an excess of the hydrosilyl-containing compound represented by one of the general formulas (22) to (28) shown above in the presence of a hydrosilylation catalyst. Among such compounds, the following ones are preferred in view of the ready availability of raw materials, the ease of removal of the siloxane used in excess and, further, the compatibility with the vinyl polymer (A):

Pat. No. 3,159,601 and U.S. Pat. No. 3,159,662, as well as platinum alcoholate catalysts described by Lamoreaux et al. in U.S. Pat. No. 3,220,972.

As examples of other catalysts than platinum compounds, there may be mentioned $RhCl(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$ and $TiCl_4$, among others. These catalysts may be used singly or two or more of them may be used in combination. From the catalyst activity viewpoint, chloroplatinic acid, platinum-olefin complexes, platinum-vinylsiloxane complexes, $Pt(acac)_2$ and the like are preferred.

The amount of the catalyst is not particularly restricted but recommendably is within the range of $10^{-1}$ to $10^{-8}$ mole, preferably $10^{-2}$ to $10^{-6}$ mole, per mole of the alkenyl group in the component (A). Since the hydrosilylation catalyst is generally expensive and corrosive and, in some cases, may cause generation of a large amount of hydrogen gas, hence foaming of curing products, it is preferred that it be not used in an amount not more than $10^{-1}$ mole.

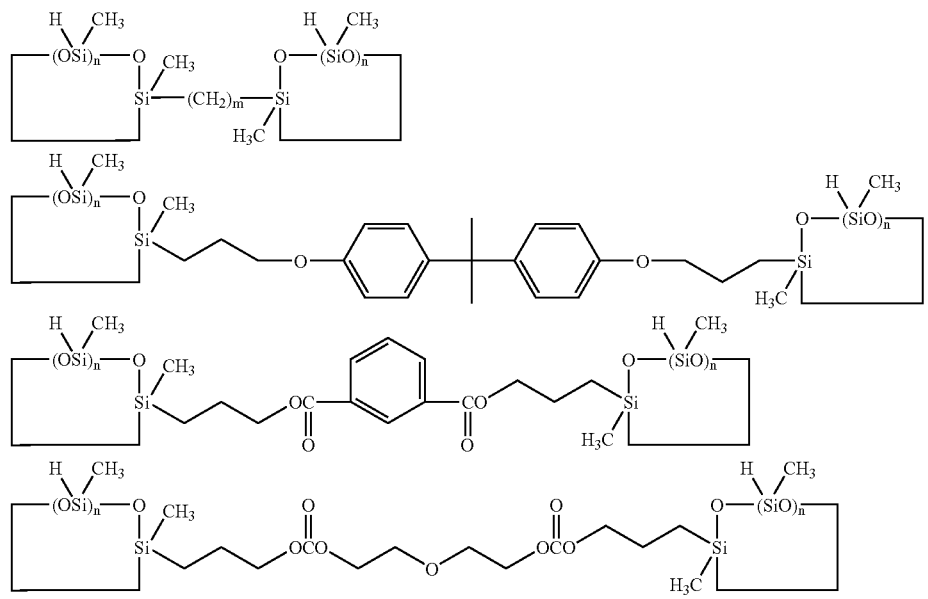

(n being an integer of 2 to 4 and m being an integer of 5 to 10).

<<Re: Hydrosilylation Catalyst (C)>>

The hydrosilylation catalyst, which is the (C) component according to the invention, is not particularly restricted but any arbitrarily selected one can be used. Specific examples are chloroplatinic acid, simple substance platinum, solid platinum supported on such a carrier as alumina, silica or carbon black; platinum-vinylsiloxane complexes {e.g. $Pt_n(ViMe_2SiOSiMe_2Vi)_n$, $Pt[(MeViSiO)_4]_m$}; platinum-phosphine complexes {e.g. $Pt(PPh_3)_4$, $Pt(PBu_3)_4$; platinum-phosphite complexes {e.g. $Pt[P(OPh)_3]_4$, $Pt[P(OBu)_3]_4$} (in the formulas, Me represents a methyl group, Bu a butyl group, Vi a vinyl group and Ph a phenyl group, and n and m each represents an integer); $Pt(acac)_2$ and, further, platinum-hydrocarbon complexes described by Ashby et al. in U.S.

<<Re: Aliphatic Unsaturated Bond-Containing Compound (D)>>

The (D) component to be used in accordance with the present invention is a component for improving the storage stability of the curable composition comprising, as a main component, the vinyl polymer (A) having at least one hydrosilylatable alkenyl group at temperatures higher than room temperature.

The (D) component according to the invention is an aliphatic unsaturated bond-containing compound [other than the compound used as the (A) component according to the invention]. Preferably, the (D) component according to the invention is not a polymer. The molecular weight of the component (D) according to the invention is not particularly restricted but preferably is not lower than 50 but not higher than 600, more preferably not lower than 110 but not higher than 300.

As examples of the (D) component, namely the aliphatic unsaturated bond-containing compound, there may be mentioned acetylene alcohols, in particular acetylene alcohols represented by the formula:

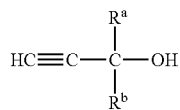

(wherein $R^a$ and $R^b$ are the same or different and each represents a hydrogen atom, an alkyl group containing 1 to 10 carbon atoms or an aryl group containing 6 to 10 carbon atoms and they may be connected to each other). In particular, in these acetylene alcohols, the bulkiness of $R^a$ and/or $R^b$ greatly contributes to the storage stability, so that those in which $R^a$ and/or $R^b$ is bulky are preferred in view of better storage stability at elevated temperatures. Excessive bulkiness, however, disadvantageously decreases the curability in spite of good storage stability. It is thus important to select an acetylene alcohol balanced between storage stability and curability.

As examples of acetylene alcohol species balanced between storage stability and curability, there may be mentioned 2-phenyl-3-butyn-2-ol, 1-ethynyl-1-cyclohexanol, 3,5-dimethyl-1-hexyn-3-ol, 3-methyl-1-hexyn-3-ol, 3-ethyl-1-pentyn-3-ol, 2-methyl-3-butyn-2-ol, and 3-methyl-1-pentyn-3-ol, and the like.

As aliphatic unsaturated bond-containing compounds other than acetylene alcohols, there may be mentioned, for example, ene-yne compounds represented by the formula:

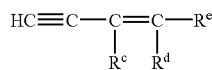

(wherein $R^c$, $R^d$ and $R^e$ are the same or different and each is a hydrogen atom or a hydrocarbon group containing 1 to 6 carbon atoms and the total number of the carbon atoms contained in $R^c$, $R^d$ and $R^e$ is 2 to 6 and, when $R^c$ and $R^d$ or $R^d$ and $R^e$ are hydrocarbon groups, the two may be connected to each other);

silane compounds represented by the formula:

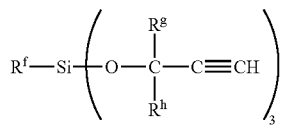

(wherein $R^f$, $R^g$ and $R^h$ are the same or different and each is a hydrocarbon group containing 1 to 10 carbon atoms and $R^g$ and $R^h$ may be connected to each other);

polysiloxane compounds represented by the formula:

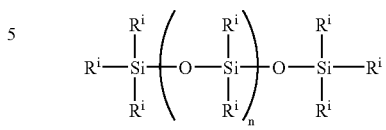

(wherein the three $R^i$ groups may be the same or different and each is a hydrocarbon group containing 1 to 10 carbon atoms but at least one of them has an acetylenically unsaturated bond and n represents an integer of 1 to 10);

olefinic compounds represented by the formula:

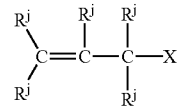

(wherein the five $R^j$ groups may be the same or different and each represents a hydrogen or halogen atom or a hydrocarbon group containing 1 to 10 carbon atoms and X represents a halogen atom, such as a chlorine or bromine atom, or an alkoxy group); aliphatic carboxylic acid esters of olefinic alcohols, such as vinyl acetate; cyclic tetravinylsiloxanes; aliphatic unsaturated bond-containing nitriles such as 2-pentenenitrile; and α,β-unsaturated carboxylic acid esters such as alkyl acetylenedicarboxylates, maleic acid esters and diorgano-fumarates.

Among these, α,β-unsaturated carboxylic acid esters are preferred, and maleic acid esters are particularly preferred.

The boiling point, at ordinary pressure (atmospheric pressure), of the (D) component is not particularly restricted but preferably is not lower than 140° C.

The level of addition of the (D) component can be selected almost arbitrarily provided that it can be uniformly dispersed in the (A) and (B) components. Preferably, however, it is used in an amount within the range of 2 to 10,000 mole equivalents relative to the (C) component hydrosilylation catalyst.

The aliphatic unsaturated bond-containing compound, which is the component (D), may comprise one single species or a combination of two or more species.

<<Re: Amine Compound (E)>>

The amine compound (E) is an optional component according to the first aspect of the invention but, from the storage stability viewpoint, the incorporation thereof is preferred. The (E) component amine compound is not particularly restricted but may be a compound containing at least one nitrogen atom within the molecule. An amine compound containing no nitrogen-hydrogen bond within the molecule is particularly preferred since it will not reduce the activity of the (C) component hydrosilylation catalyst. Further, an amine compound containing two nitrogen atoms within the molecule is preferred since such compound increases the storage stability.

The (E) component amine compound is preferably one having the following structure:

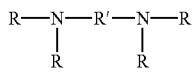

In the above formula, the four R groups may be the same or different and each is a hydrocarbon group containing 1 to 20 carbon atoms or a hydrogen atom, any two R groups may be connected to each other, and, preferably, each R is a univalent saturated hydrocarbon group containing 1 to 20 carbon atoms. On the other hand, R' is a divalent hydrocarbon group containing 1 to 24 carbon atoms, preferably a saturated hydrocarbon group containing 1 to 20 carbon atoms or an aromatic ring-containing hydrocarbon group containing 1 to 24 carbon atoms (containing no unsaturated group other than an aromatic ring).

Preferred specific examples of the (E) component are N,N,N',N'-tetramethylethylenediamine, N,N-dimethylethylenediamine, N,N-diethylethylenediamine, N,N-dibutylethylenediamine, N,N-dibutyl-1,3-propanediamine, N,N-dimethyl-1,3-propanediamine, N,N,N',N'-tetraethylethylenediamine, N,N-dibutyl-1,4-butanediamine, and 2,2'-bipyridine. Among these, N,N,N',N'-tetramethylethylenediamine is more preferred.

The level of addition of the (E) component is not particularly restricted but preferably is within the range of 1 to 50 mole equivalents relative to the (C) component hydrosilylation catalyst. When the addition level is excessively high, the activity of the (C) component hydrosilylation catalyst is decreased and, when it is too low, the storage stability decreases. The (E) component amine compound may comprise one single species or a combination of two or more species.

<<Re: Electric Conductivity Providing Substance (F)>>

The (F) component according to the invention is a component for providing the curing product derived from the composition comprising the vinyl polymer as a main component with electric conductivity. The (F) component electric conductivity providing agent to be used according to the invention includes carbon black, metal oxides, microparticles of metals and, further, electrically conducting unit-containing compounds or antistatic agents such as high molecular compounds, typically organic compounds or polymers having a quaternary ammonium group, carboxylic acid group, sulfonic acid group, sulfate ester group, phosphate ester group or like group, ether ester imide or ether imide polymers, ethylene oxide-epihalohydrin copolymers, and methoxypolyethylene glycol acrylate. Among these, carbon black is preferred. The component (F) to be used according to the invention may comprise one single species or a combination of two or more species.

As examples of the above-mentioned carbon black, there may be mentioned furnace black, acetylene black, lamp black, channel black, thermal black and oil black, among others. The grade, particle size and other features of such carbon black species are not particularly restricted but the carbon black is preferably added in an amount sufficient to provide the composition with electric conductivity in a resistance range of $10^5$ Ωcm to $10^{13}$ Ωcm.

Thus, the level of addition of the (F) component is preferably 0.1 to 200 parts by weight, more preferably 1 to 100 parts by weight, per 100 parts of the (A) component polymer. When the addition level is too low, the electric conductivity of the resulting conductive material tend to be subject to variation and, when it is excessively high, the flowability of the composition is impaired, whereby the workability is decreased.

The hydrosilylation reaction may be inhibited by some electric conductivity providing substances or at certain addition levels of such substances, hence the possible influences of the electric conductivity providing agent on the hydrosilylation reaction should be taken into consideration.

<<Other Optional Components>>

In the curable composition of the present invention, there may be incorporated one or more of various additives for modifying the physical properties thereof, for example flame retardants, antioxidants, fillers, plasticizers, physical property-adjusting agents, adhesiveness providing agents, storage stability improving agents, solvents, radical inhibitors, metal deactivators, antiozonants, phosphorus-containing peroxide decomposing agents, lubricants, pigments, foaming agents, photocurable resins and the like, in appropriate amounts as necessary. These additives may be used singly or two or more of them may be used in combination. Since the vinyl polymer is excellent in nature in durability, hence the use of an antioxidant is not always necessary. However, any of those antioxidants, ultraviolet absorbers, light stabilizers and like additives which are known in the art can be used each in an appropriate amount.

<Fillers>

The filler which can be incorporated is not particularly restricted but includes, among others, microparticles of silica, calcium carbonate, talc, titanium oxide, diatomaceous earth, barium sulfate, carbon black, surface-treated finely divided calcium carbonate, calcined clay, clay and activated hydrozincate and like reinforcing fillers for providing strength and other physical properties. These reinforcing fillers may be used singly or two or more of them may be used in combination. Among them, microparticles of silica species are preferred. Thus, hydrous silica obtained by the wet process or the like, and dry process silica obtained by the dry process can be used, among others. Among them, anhydrous silica is particularly preferred since when the composition has a high moisture content, side reactions and the like may possibly occur in the curing reaction step. Furthermore, hydrophobically surface-treated anhydrous silica is particularly preferred since such can readily provide flowability suited for molding. In addition, fillers not so outstanding in reinforcing ability may also be used for extension or physical property modification.

<Plasticizer>

The plasticizer which can be incorporated is not particularly restricted but, according to the purpose of addition, for example adjustment of physical properties and/or adjustment of other properties, use can be made of one or a mixture of two or more of phthalates such as dibutyl phthalate, diheptyl phthalate, di(2-ethylhexyl) phthalate and butyl benzyl phthalate; nonaromatic dibasic carboxylates such as dioctyl adipate, dioctyl sebacate, dibutyl sebacate and isodecyl succinate; fatty acid esters such as butyl oleate and methyl acetylricinolate; polyalkylene glycol esters such as diethylene glycol dibenzoate, triethylene glycol dibenzoate and pentaerythritol esters; phosphates such as tricresyl phosphate and tributyl phosphate; trimellitates; polystyrenes such as polystyrene and poly-α-methylstyrene; polybutadiene, polybutene, polyisobutylene, butadiene-acrylonitrile, polychloroprene; chlorinated paraffins; hydrocarbon oils such as alkyldiphenyls and partially hydrogenated terphenyl; process oils; polyether polyols such as polyethylene glycol, polypropylene glycol, polytetramethylene glycol and the like and derivatives of these polyether polyols as resulting from conversion of hydroxyl groups thereof to ester, ether and/or like groups; epoxy plasticizers such as epoxidized soybean oil and benzyl epoxystearate; polyester plasticizers obtained from a dibasic acid, such as sebacic acid, adipic acid, azelaic acid or phthalic acid, and a dihydric alcohol, such as ethylene glycol, diethylene glycol, triethylene glycol, propylene glycol or dipropylene glycol; and vinyl polymers obtained by polymerizing a vinyl monomer(s) by various methods, typically acrylic plasticizers, among others, although these are not always necessary. It is also possible to incorporate these plasticizers in the process of polymer production.

In addition to the plasticizers mentioned above, a reactive diluent (G), which is to be mentioned referring to the second aspect of the present invention, can also be incorporated in the same manner in the first aspect of the invention as well.

<Solvent>

As examples of the solvent which can be incorporated, there may be mentioned aromatic hydrocarbon solvents such as toluene and xylene, ester solvents such as ethyl acetate, butyl acetate, amyl acetate and cellosolve acetate, and ketone solvents such as methyl ethyl ketone, methyl isobutyl ketone and diisobutyl ketone, among others. These solvents may also be used in the step of polymer production.

<Adhesive Property Providing Agent>

The adhesive property providing agent to be incorporated is not particularly restricted but may be any of those capable of providing the curing products obtained by crosslinking of the vinyl polymer (A) and hydrosilyl group-containing compound (B) with adhesive properties. A crosslinking silyl group-containing compound is preferred, however, and a silane coupling agent is more preferred. As specific examples thereof, there may be mentioned alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane and methyltriisopropenoxysilane; vinyl type unsaturated group-containing silanes such as vinyltrimethoxysilane, vinyldimethylmethoxysilane, vinyltriethoxysilane, γ-methacryloyloxypropylmethyldimethoxysilane and γ-acryloyloxypropylmethyltriethoxysilane; polysiloxanes and so forth. Among them, silane coupling agents having, within the molecule, both a crosslinking silyl group and an organic group having an atom other than carbon and hydrogen atoms, for example an epoxy group, (meth)acrylic group, isocyanato group, isocyanurate group, carbamate group, amino group, mercapto group or carboxyl group are preferred.

As specific examples thereof, there may be mentioned isocyanato group-containing alkoxysilanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane and like isocyanato group-containing silanes; isocyanurate group-containing alkoxysilanes such as tris(trimethoxysilyl) isocyanurate and like isocyanurate silanes; amino group-containing alkoxysilanes such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane and like amino group-containing silanes; mercapto group-containing alkoxysilanes such as γ-mercaptopropyltrimethoxysilane, γ-mercaptopropyltriethoxysilane, γ-mercaptopropylmethyldimethoxysilane, γ-mercaptopropylmethyldiethoxysilane and like mercapto group-containing silanes; carboxyl group-containing alkoxysilanes such as β-carboxyethyltriethoxysilane, β-carboxyethylphenylbis(2-methoxyethoxy)silane, N-β-(carboxymethyl)aminoethyl-γ-aminopropyltrimethoxysilane and like carboxysilanes; halogen group-containing alkoxysilanes such as γ-chloropropyltrimethoxysilane and like halogen-containing silanes.

Also usable as the silane coupling agent are modification derivatives of these, for example amino-modified silyl polymers, silylated amino polymers, unsaturated aminosilane complexes, phenylamino-long chain alkylsilanes, aminosilylated silicones and silylated polyesters.

Further, among these, alkoxysilanes having an epoxy group or (meth)acrylic group within the molecule are preferred from the curability and adhesiveness viewpoint. More specific examples are epoxy group-containing alkoxysilanes such as γ-glycidoxypropylmethyldimethoxysilane, γ-glycidoxypropyltrimethoxysilane, γ-glycidoxypropyltriethoxysilane, β-(3,4-epoxycyclohexyl)ethyltrimethoxysilane, β-(3,4-epoxycyclohexyl)ethyltriethoxysilane and γ-glycidoxypropylmethyldiisopropenoxysilane, and (meth) acrylic group-containing alkoxysilanes such as γ-methacryloxypropyltrimethoxysilane, γ-methacryloxypropyltriethoxysilane, γ-acryloxypropyltrimethoxysilane, γ-acryloxypropyltriethoxysilane, methacryloxymethyltrimethoxysilane, methacryloxymethyltriethoxysilane, acryloxymethyltrimethoxysilane and acryloxymethyltriethoxysilane, among others. These may be used singly or two or more of them may be used in combination.

For further improving the adhesiveness, a crosslinking silyl group condensation catalyst can be used in combination with the above adhesive property providing agent. As the crosslinking silyl group condensation catalyst, there may be mentioned organotin compounds such as dibutyltin dilaurate, dibutyltin diacetylacetonate, dibutyltin dimethoxide and stannous octylate, organoaluminum compounds such as aluminum acetylacetonate, and organotitanium compounds such as tetraisopropoxytitanium and tetrabutoxytitanium, among others.

Other specific examples than silane coupling agents include, but are not particularly limited to, epoxy resins, phenol resins, sulfur, alkyl titanates, aromatic polyisocyanate compounds and the like.

The above adhesive property providing agent is used preferably in an amount within the range of 0.01 to 20 parts by weight per 100 parts by weight of the vinyl polymer (A). At a level below 0.01 part by weight, the adhesiveness improving effect is poor and, at levels exceeding 20 parts by weight, the physical properties of the curing products are adversely affected. The range of 0.1 to 10 parts by weight is preferred, and the range of 0.5 to 5 parts by weight is more preferred.

The adhesive property providing agents specifically mentioned above may be used singly or two or more of them may be used in admixture. By adding these adhesive property providing agents, it is possible to improve the adhesiveness to adherends.

<<Method of Producing Curing Products According to the First Aspect of the Invention>>

The vinyl polymer (A) and hydrosilyl group-containing compound (B) may be mixed together in an arbitrary ratio. From the curability viewpoint, however, the mole ratio between the alkenyl group and hydrosilyl group is preferably within the range of 5 to 0.2, more preferably 2.5 to 0.4. When the mole ratio is higher than 5, only sticky curing products insufficient in curing and low in strength can be obtained. When it is lower than 0.2, the hydrosilyl group remains in large amounts in the curing products even after curing, causing the occurrence of cracks and voids, hence no uniform and strong curing products can be obtained.

In accordance with the present invention, the curable composition is cured by the addition reaction of the Si—H group onto the alkenyl group in the presence of a noble metal catalyst, so that the rate of curing is very rapid and this is favorable to line production. In particular, the heat curing temperature is preferably within the range of 100° C. to 180° C. At temperatures lower than 100° C., the curing reaction hardly proceeds since the composition has good storage stability. At about 100° C. and above, however, the hydrosilylation reaction abruptly proceeds to give curing products in a short period of time.

The curable composition of the present invention is superior in storage stability even at relatively high temperatures, so that the composition can be handled at lower viscosity levels and, accordingly, it is suited for use in liquid injection molding at elevated temperatures, among others.

In causing the curable composition to flow in the practice of the present invention, a temperature of not lower than 30° C. but lower than 100° C. is preferably employed. More preferably, the composition is caused to flow at a temperature of not lower than 40° C. but lower than 80° C.

In using the curable-composition of the invention, the curable composition is caused to flow at a temperature of not lower than 30° C. but lower than 100° C. and can further be subjected to curing reaction while allowing the composition to flow. Using the curable composition of the invention means the use thereof for an intended purpose and, therefore, the curable composition of the invention can be used also as a resin for injection molding (RIM, LIM, etc.).

"Causing the curable composition to flow" so referred to herein means, for example, that the curable composition is mixed, stirred and/or discharged or is changed in form by pouring the same into a mold or the like. When the curable composition is simply cured at a temperature of not lower than 30° C. but lower than 100° C. in the practice of the invention, this is not referred to as "causing the curable composition to flow". Thus, when a product is sealed using the curable composition at below 30° C. and then thermally cured at a temperature of not lower than 30° C. but lower than 100° C., this is not referred to as "causing the curable composition to flow".

<<Method of Molding the Curable Composition of the First Aspect of the Invention>>

In using the curable composition of the invention in the form of moldings, the method of molding is not particularly restricted but may be any of various molding methods in general use, for example cast molding, compression molding, transfer molding, injection molding, extrusion molding, rotational molding, blow molding, thermoforming, etc. In particular, injection molding is preferred in view of the possibility of automation and continuous operation, and good productivity. For use as gaskets or the like, both the wet type process, in which the curable composition coated on faces of flanges or the like is compressed from both sides in the uncured condition, followed by curing, and the dry type one, in which the composition is first cured and then compressed, can be used.

<<Uses of the Curable Composition of the First Aspect of the Invention>>

The curable composition of the present invention can be used in various fields of application which include, but are not limited to, sealants, for example elastic sealants for building and construction and sealing materials for multilayer glass, materials for electric and electronic parts such as solar cell backside sealants, electric insulating materials such as wire or cable insulating sheathing materials, pressure sensitive adhesives, adhesives, elastic adhesives, paints, powder coatings, coating materials, foamed bodies, potting materials for electric and electronic use, films, gaskets, casting materials, artificial marble, various molding materials, and rustproof and waterproof sealants for end faces (cut sections) of net glass or laminated glass.

Further, moldings showing rubber elasticity as obtained from the curable composition of the invention can be widely used as gaskets and packings. For example, they can be used as body parts in the automobile field, sealants for securing airtightness, vibration insulating materials for glass, and vibration insulating materials for automotive bodies, in particular, window sealing gaskets and door glass gaskets. They can be used as chassis parts, such as engine and suspension rubbers for vibration and sound insulation, in particular engine mount rubbers. As for engine parts, they can be used in producing hoses for cooling, fuel feeding and exhaust control, or as engine oil sealants and so on. They can be used also as or in exhaust gas cleaner parts and brake parts.

In the field of household electric appliances, they can be used as packings, O rings, belts and the like. More specifically, they can be used as decorations for lights, waterproofing packings, vibration insulating rubbers, packings for protection against insects, vibration and sound insulating and airtight sealing materials for cleaners, covers for protecting water warmers against water drops, watertight packings, packings for heater parts, packings for electrode parts, safety valve diaphragms, hoses and watertight packings for sake warmers, watertight packings for electromagnetic valves, steam oven ranges and rice cookers, water tank packings, water valves, sink packings, connecting hoses, belts, heat-retaining heater packings, oil packings for combustion apparatus, for example steam diffuser seals, O rings, drain packings, pressure tubes, blast tubes, air feeder/inlet packings, vibration insulating rubbers, fuel filler packings, fuel level indicator packings, fuel pipes, diaphragm valves, air-supplying pipes and so forth as well as speaker gaskets, speaker edges, turntable sheets, belts, pulleys and the like for acoustic apparatus, among others.

In the field of building and construction, they can be used as or in structural gaskets (zipper gaskets), air membrane structure roofing materials, waterproofing materials, shaped sealants, vibration insulators, sound insulators, setting blocks, sliders and so on. In the field of sports, they can be used as or in sports floors such as all weather pavement materials and gymnasium floors, in the field of sports shoes, as sole materials and insole materials and, in the field of ball games, as golf balls and so on. In the vibration insulating rubber field, they can be used as vibration insulating rubbers for automobiles, vibration insulating rubbers for railroad vehicles, vibration insulating materials for airplanes, fenders, and so on. In the field of marine and civil engineering, they can be used in or as structural materials such as rubber expansion joints, bearing structures, water sealing plates, waterproofing sheets, rubber dams, elastic pavement materials, vibration insulating pads, protective structures, etc., supplementary building and construction materials such as rubber molds or forms, rubber packers, rubber skirts, sponge mats, mortar hoses, mortar strainers, etc., and auxiliary building and construction materials such as rubber sheets, air hoses, etc., safety countermeasure goods such as rubber buoys, wave absorbing structures, etc., and environmental preservation goods such as oil fences, silt fences, antifoulants, marine hoses, dressing hoses, oil skimmers and so forth. Furthermore, they may be used as plate or sheet rubbers, mats, foamed plates, etc.

The second aspect of the invention is now described.

The vinyl polymer (A) and hydrosilyl group-containing compound (B) are as described in detail referring to the first aspect of the invention.

<<RE: Organic Compound (G) having at Least One Hydrosilylatable Alkenyl or Alkynyl Group within the Molecule [Other than the Above-Mentioned Component (A)]: Reactive Diluent>>

In the practice of the present invention, the organic compound (G) having at least one hydrosilylatable alkenyl or alkynyl group within the molecule [other than the above-mentioned component (A)] reduces the viscosity of the composition before curing and, in the step of curing reaction, it binds to the Si—H group of the hydrosilylatable group-containing compound (B) in the manner of hydrosilylation reaction and is eventually included in the network structure.

Therefore, in the practice of the invention, it may be any organic compound having at least one hydrosilylatable alkenyl or alkynyl group within the molecule, without any particular restriction. One lower in viscosity than the vinyl polymer (A) is preferred, however. From the viewpoint of physical properties of curing products to be obtained, one compatible with the vinyl polymer (A) is preferred. In view of good compatibility with the vinyl polymer (A), a compound having a polar group, such as an ester group, is preferred.

The molecular weight is preferably as low as possible since the compatibility increases with the decrease in molecular weight. However, it may be rather high if the compound shows sufficient compatibility. Specifically, the organic compound (G) preferably has a molecular weight of not higher than 400.

The hydrosilylatable alkenyl or alkynyl group in the organic compound (G) is preferably a vinyl group in view of its high reactivity.

From the viewpoint of heat resistance and weatherability, among others, which are characteristic features of the composition of the invention, it is more preferable that the organic compound (G) be free of any carbon-carbon unsaturated bond that is low in activity relative to hydrosilylation.

If a low-boiling compound capable of evaporating during curing is used as the organic compound (G), it may cause a morphological change after curing as compared with the shape before curing and the vapor may also exert an adverse influence on the environment. Therefore, an organic compound having a boiling point of not lower than 100° C. at atmospheric pressure is particularly preferred.

The organic compound (G) to be used in the practice of the invention is preferably a non-polymer organic compound. The non-polymer organic compound so referred to herein is one other than compounds obtained by polymerization. The term "polymerization" means a chemical change involving conversion of one kind of unit substance to a substance having a molecular weight resulting from multiplying that of the unit substance (Encyclopedia Chimica).

Specific examples of the organic compound (G) include, but are not limited to, hydrocarbon compounds such as 1-octene and 4-vinylcyclohexene, and ester group-containing organic compounds such as allyl acetate, 1,1-diacetoxy-2-propene, methyl 1-undecenoate and 8-acetoxy-1,6-octadiene.

On the other hand, the level of addition of the organic compound (G) is not particularly restricted on condition that the formation of three-dimensionally crosslinked structures by the hydrosilylation reaction between the vinyl polymer (A) and hydrosilyl group-containing compound (B) is not disturbed. Thus, when the level of addition of the organic compound (G) becomes excessive, the Si—H group of the hydrosilyl group-containing compound (B) is consumed by the hydrosilylation reaction thereof with the unsaturated group of the organic compound (G), so that the formation of three-dimensionally crosslinked structures by the vinyl polymer (A) may become insufficient.

The organic compound (G) is used generally in an amount of 0.1 to 100 parts by weight, preferably 0.5 to 70 parts by weight, more preferably 1 to 50 parts by weight, per 100 parts by weight of the vinyl polymer (A).

In the second aspect of the present invention, the same compounds as the "other optional components" described in detail referring to the first aspect of the invention can also be incorporated each in an appropriate amount. In cases where a plasticizer such as described referring to the first aspect of the invention is incorporated, the level of addition thereof is preferably within the range within which the effects of the organic compound (G) are not counteracted.

For preventing the viscosity of the composition from increasing during storage and the rate of curing after storage from changing markedly, any of those storage stability improving agents which are known in the art may be incorporated. Such storage stability improving agent is not particularly restricted but includes, among others, benzothiazole and dimethyl maleate.

For further promoting the reaction in the step of curing, a hydrosilylation catalyst is preferably incorporated in the composition according to the second aspect of the invention. Such hydrosilylation catalyst is not particularly restricted but may be a radical initiator such as an organic peroxide or azo compound, or a transition metal catalyst, for instance.

The radical initiator is not particularly restricted but includes, among others, dialkyl peroxides such as di-t-butyl peroxide, 2,5-dimethyl-2,5-di(t-butylperoxy)hexane, 2,5-dimethyl-2,5-di(t-butylperoxy)-3-hexyne, dicumyl peroxide, t-butyl cumyl peroxide and α,α'-bis(t-butylperoxy)isopropylbenzene, diacyl peroxides such as benzoyl peroxide, p-chlorobenzoyl peroxide, m-chlorobenzoyl peroxide, 2,4-dichlorobenzoyl peroxide and lauroyl peroxide, peresters such as t-butyl perbenzoate, diisopropyl peroxydicarbonate and di-2-ethylhexyl peroxydicarbonate, and peroxyketals such as 1,1-di(t-butylperoxy)cyclohexane and 1,1-di(t-butylperoxy)-3,3,5-trimethylcyclohexane.

The transition metal catalyst is not particularly restricted, either, but includes, among others, simple substance platinum, solid platinum dispersed on a carrier such as alumina, silica or carbon black, chloroplatinic acid, chloroplatinic acid-alcohol, aldehyde or ketone complexes, platinum-olefin complexes, platinum(0)-divinyltetramethyldisiloxane and like complexes. As other catalysts than platinum compounds, there may be mentioned $RhCl(PPh_3)_3$, $RhCl_3$, $RuCl_3$, $IrCl_3$, $FeCl_3$, $AlCl_3$, $PdCl_2 \cdot H_2O$, $NiCl_2$ and $TiCl_4$. These catalysts may be used singly or two or more of them may be used in combination.

The amount of the catalyst is not particularly restricted but recommendably is within the range of $10^{-1}$ to $10^{-8}$ mole, preferably within the range of $10^{-3}$ to $10^{-6}$ mole, per mole of the alkenyl group in the component (A). When it is smaller than $10^{-8}$ mole, the curing will not proceed to a satisfactory extent. Since the hydrosilylation catalyst is generally expensive and corrosive and may cause, in some cases, generation of a large amount of hydrogen gas, hence foaming of curing products, it is preferred that an amount thereof not more than $10^{-1}$ mole be not used.

<<Method of Producing Curing Products in Accordance with the Second Aspect of the Invention>>

The vinyl polymer (A) and hydrosilyl group-containing compound (B) can be mixed together in an arbitrary ratio. From the curability viewpoint, however, the mole ratio between the alkenyl group and hydrosilyl group is preferably within the range of 5 to 0.2, more preferably 2.5 to 0.4. When the mole ratio is higher than 5, the curing will be insufficient and only curing products that are sticky and low in strength can be obtained. When the ratio is lower than 0.2, the active hydrosilyl group remains in large amounts in curing products even after curing, so that cracks and voids occur, making it impossible to obtain uniform and strong curing products.

In mixing the vinyl polymer (A), the hydrosilyl group-containing compound (B) and the organic compound (G) together, it is preferred from the curability viewpoint that the mole ratio between the alkenyl group and hydrosilyl group be within the range of 5 to 0.2, more preferably 2.5 to 0.4.

The curing temperature is not particularly restricted but, generally, it is recommended that curing be carried out at 0° C. to 200° C., preferably 30° C. to 150° C., more preferably 80° C. to 150° C. In this way, the curing composition can be cured in a short period of time.

The method of molding and the uses of the curable composition according to the second aspect of the invention are the same as in the case of the curable composition according to the first aspect of the invention.

The third aspect of the invention is now described.

The vinyl polymer (A) and hydrosilyl group-containing compound (B) are the same as those described in detail referring to the first aspect of the invention.

<<Re: Carbon Black (H)>>

The carbon black (H) to be used in the practice of the invention includes the classes: furnace black, channel black, acetylene black and thermal black. It is not limited to a particular species but, in view of the reinforcing effect, cost and availability, among others, furnace black is preferred.

The pH of the carbon black is not particularly restricted but preferably is not higher than 9.5 since when it is higher than 9.5, the hydrosilylation reaction in the curable composition of the invention may be prevented.

On the other hand, the level of addition of carbon black (H) is not particularly restricted but preferably is 0.1 to 500 parts by weight, preferably 0.5 to 100 parts by weight, more preferably 1 to 50 parts by weight, per 100 parts by weight of the vinyl polymer (A). When the addition level is lower than 0.1 part by weight, the effect of improving the tensile strength at break of curing products may be unsatisfactory and, when it exceeds 500 parts by weight, the workability of the curable composition may decrease and the physical properties of curing products may deteriorate. In the practice of the invention, the carbon black (H) may comprise one single species or a combination of two or more species.

In the third aspect of the invention, the same compounds as the "other optional components" described in detail referring to the first and second aspects of the invention can also be incorporated each in an appropriate amount.

<<Method of Producing Curing Products in Accordance with the Third Aspect of the Invention>>

The vinyl polymer (A) and hydrosilyl group-containing compound (B) can be mixed together in an arbitrary ratio. From the curability viewpoint, however, the mole ratio between the alkenyl group and hydrosilyl group is preferably within the range of 5 to 0.2, more preferably 2.5 to 0.4. When the mole ratio is higher than 5, the curing will be insufficient and only curing products that are sticky and low in strength can be obtained. When the ratio is lower than 0.2, the active hydrosilyl group remains in large amounts in curing products even after curing, so that cracks and voids occur, making it impossible to obtain uniform and strong curing products. The curing temperature is not particularly restricted but, generally, it is recommended that curing be carried out at 0° C. to 200° C., preferably 30° C. to 150° C., more preferably 80° C. to 150° C. In this way, the curing composition can be cured in a short period of time.

The method of molding and the uses of the curable composition according to the third aspect of the invention are the same as in the case of the curable composition according to the first aspect of the invention.

<<Mechanical Properties of Curing Products According to the Third Aspect of the Invention>>

The curable composition of the invention is preferably one such that the curing products obtained by curing the same have a tensile strength at break of not lower than 1 MPa, more preferably not lower than 1.5 MPa, although this is not a necessary condition. Further, it is preferably a curable composition such that the breaking elongation amounts to not less than 50%, more preferably not less than 100%, although this is not a necessary condition.

The curable composition of the invention is preferably one in which the reinforcing effect of the addition of carbon black (H) according to the invention is such that the tensile strength at break is not less than 1.5 times, preferably not less than 2 times, as compared with the case of no addition, although this is not a necessary condition.

In the present invention, unless otherwise specified, No. 2 (⅓) dumbbell test specimens (JIS K 7113) were punched out from each sheet-like curing product and measured for tensile properties using a Shimadzu autograph (measurement environment: 23° C., rate of pulling: 200 mm/min).

The method of molding and the uses of the curable composition according to the third aspect of the invention are the same as in the case of the curable composition according to the first aspect of the invention.

BEST MODES FOR CARRYING OUT THE INVENTION

In the following, typical examples of the present invention are described together with some comparative examples. The following examples are by no means limitative of the scope of the invention, however.

In the following examples and comparative examples, "part(s)" and "%" mean "part(s) by weight" and "% by weight", respectively.

In the following examples, the "number average molecular weight" and "molecular weight distribution (ratio of weight average molecular weight to number average molecular weight)" were determined by the standard polystyrene equivalent method using gel permeation chromatography (GPC). The GPC columns used were two crosslinked polystyrene gel-packed columns (Shodex GOC K-802.5; product of SHOWA DENKO) (Shodex GPC K-804; product of SHOWA DENKO) connected in series, and the GPC solvent used was chloroform.

PRODUCTION EXAMPLE 1

A 10-liter separable flask equipped with a reflux condenser and a stirrer was charged with CuBr (36.02 g, 0.2511 mol), and the reaction vessel inside was purged with nitrogen. Acetonitrile (618 mL) was added, and the contents were stirred on an oil bath at 70° C. for 15 minutes. Thereto were added butyl acrylate (360 mL, 2.51 mol), ethyl acrylate (500 mL, 4.62 mol), 2-methoxyethyl acrylate (375 mL, 2.91 mol), diethyl 2,5-dibromoadipate (150.68 g, 0.419 mol) and pentamethyldiethylenetriamine (hereinafter referred to as "triamine" for short) (2.18 mL, 1.81 g, 10.46 mmol), and the reaction was thereby started. While heating at 70° C. with stirring, a mixture composed of butyl acrylate (1,440 mL), ethyl acrylate (2,002 mL) and 2-methoxyethyl acrylate (1,498 mL) was added dropwise continuously over 210 minutes. During the dropping of the monomer mixture, triamine (7.63mL, 6.33 g, 36.5 mmol) was added. After the lapse of 330 minutes after start of the reaction, 1,7-octadiene (1,236 mL, 922 g, 8.37 mol) and triamine (26.16 mL, 21.71 g, 0.125 mol) were added, and the heating at 70° C. with stirring was continued for 250 minutes.

The reaction mixture was diluted with toluene and passed through an activated alumina column, and the volatile matter was then distilled off under reduced pressure to give an alkenyl-terminated copolymer (alkenyl-terminated poly(butyl acrylate, ethyl acrylate, methoxyethyl acrylate) copolymer: copolymer [1]}.

A 10-liter separable flask equipped with a reflux condenser was charged with the copolymer [1] (2.87 kg), potassium acetate (79.57 g) and N,N-dimethylacetamide (2.9 L), and the mixture was heated at 100° C. with stirring under a nitrogen stream for 12 hours. The N,N-dimethylacetamide was removed by heating under reduced pressure, and the residue was diluted with toluene. The toluene-insoluble matter (KBr and excess potassium acetate) was filtered off using an activated alumina column. The volatile matter was distilled off from the filtrate under reduced pressure to give a copolymer (copolymer [2]).

A 10-liter separable flask equipped with a reflux condenser was charged with the copolymer [2] (2.87 kg), acidic aluminum silicate (143 g, Kyowaad 700 SL, product of Kyowa Chemical), basic aluminum silicate (143 g, Kyowaad 500 SH, product of Kyowa Chemical) and toluene (5.2 L), and the mixture was heated at 100° C. under a nitrogen stream for 7 hours. The aluminum silicate was filtered off, and the toluene was distilled off from the filtrate under reduced pressure to give a vinyl-terminated copolymer (copolymer [3]). The copolymer obtained had a number average molecular weight of 19,700 as determined by GPC measurement (polystyrene equivalent basis) with a molecular weight distribution of 1.27. The average number of vinyl groups introduced per copolymer molecule as determined by $^1$H NMR analysis was 3.11.

PRODUCTION EXAMPLE 2

A vinyl-terminated copolymer (copolymer [4]) was obtained in the same manner as in Production Example 1. The copolymer obtained had a number average molecular weight of 18,000 as determined by GPC measurement (polystyrene equivalent basis) with a molecular weight distribution of 1.24. The average number of vinyl groups introduced per copolymer molecule as determined by $^1$H NMR analysis was 2.2.

EXAMPLES 1 TO 7 AND COMPARATIVE EXAMPLES 1 TO 3

In Examples 1 to 7 and Comparative Examples 1 to 3, the amount of the linear siloxane was selected so that the SiH group of the linear siloxane might amount to 2.2 equivalents relative to the alkenyl group of the copolymer [3].

The copolymer [3] (100 parts) obtained in Production Example 1, which was used as a component (A), was mixed with 9.37 parts of a linear siloxane (containing, on an average, 5 hydrosilyl groups and, on an average, 5 α-methylstyrene groups in each molecule; Si—H content 3.70 mmol/g) as a component (B) With this mixture were uniformly admixed the bis(1,3-divinyl-1,1,3,3-tetramethyldisiloxane)-platinum complex catalyst (1.32×10$^{-6}$ mmol/μl, xylene solution) as a component (C) and 3,5-dimethyl-1-hexyn-3-ol as a component (D). The thus-obtained curable compositions were stored in an oven maintained at 50° C. After 2 hours, when no gelation was found, the composition was evaluated as O, and when gelation, even if only partially, was observed, as X. These compositions were further measured for snap-up times (SUT: time until manifestation of rubber elasticity, observed using a toothpick) at130° C. The formulations and the evaluation results are shown in Table 1.

TABLE 1

|  | Component (A) (g) | Component (B) (g) | Component (C) (ml) | Component (D) (ml) | (D)/(C) (Mole ratio) | Gelation (50° C., 2 hrs) | SUT (sec) |
| --- | --- | --- | --- | --- | --- | --- | --- |
| Example 1 | 2 | 0.187 | 0.0717 | 0.0003 | 20 | O | 7 |
| Example 2 | 2 | 0.187 | 0.0717 | 0.0028 | 200 | O | 17 |
| Example 3 | 2 | 0.187 | 0.0717 | 0.0111 | 800 | O | 29 |
| Example 4 | 2 | 0.187 | 0.0717 | 0.0278 | 2000 | O | 44 |

TABLE 1-continued

|  | Component (A) (g) | Component (B) (g) | Component (C) (ml) | Component (D) (ml) | (D)/(C) (Mole ratio) | Gelation (50° C., 2 hrs) | SUT (sec) |
|---|---|---|---|---|---|---|---|
| Example 5 | 2 | 0.187 | 0.1195 | 0.0005 | 20 | ○ | 8 |
| Example 6 | 2 | 0.187 | 0.1195 | 0.0046 | 200 | ○ | 19 |
| Example 7 | 2 | 0.187 | 0.1195 | 0.0464 | 2000 | ○ | 35 |
| Compar. Ex. 1 | 2 | 0.187 | 0.0239 | — | — | X | 14 |
| Compar. Ex. 2 | 2 | 0.187 | 0.0717 | — | — | X | 4 |
| Compar. Ex. 3 | 2 | 0.187 | 0.1195 | — | — | X | 4 |

From Table 1, it is evident that the curable compositions of the invention are superior in storage stability at elevated temperatures. It was also found that they are superior in curability at elevated temperatures.

EXAMPLES 8 TO 12 AND COMPARATIVE EXAMPLES 4 and 5

In the following examples, the amount of the linear siloxane was selected so that the SiH group of the linear siloxane might amount to 2.32 equivalents relative to the alkenyl group of the copolymer [3].

The copolymer [3] (alkenyl group content 0.158 mmol/g) obtained in Production Example 1, which was used as a component (A), was mixed with a linear siloxane (containing, on an average, 5 hydrosilyl groups and, on an average, 5α-methylstyrene groups in each molecule; Si—H content 3.70 mmol/g) as a component (B) With this mixture were uniformly admixed the bis(1,3-divinyl-1,1,3,3-tetramethyl-disiloxane)-platinum complex catalyst ($1.32 \times 10^{-5}$ mmol/μl, xylene solution) as a component (C), 3,5-dimethyl-1-hexyn-3-ol as a component (D) and tetramethylethylenediamine (TMEDA) as a component (E). The thus-obtained curable compositions were stored in an oven maintained at 50° C. and observed for the occurrence or nonoccurrence of gelation with the lapse of time. In cases where no gelation was observed, the composition was measured for snap-up time (SUT: time until manifestation of rubber elasticity, observed using a toothpick) at 150° C. In Example 12, a composition containing no TMEDA incorporated was evaluated; in Comparative Example 4, a composition without 3,5-dimethyl-1-hexyn-3-ol; and, in Comparative Example 5, a composition containing neither TMEDA nor 3,5-dimethyl-1-hexyn-3-ol. The formulations and the evaluation results are shown in Table 2.

From the results of Examples 8 to 11 as shown in Table 2, it is evident that the curable compositions according to the invention are superior in storage stability at elevated temperatures. It was further found that they are superior also in curability at elevated temperatures. The results of Example 12 indicate that the use of the acetylene alcohol alone may result in insufficient storage stability in some instances, while the results of Comparative Example 4 indicate that the use of the amine alone leads to delayed curing with the lapse of time. Further, the results of Comparative Example 5 indicate that the composition comprising the (A), (B) and (C) components alone shows gelation after 4 hours and thus very low in storage stability at elevated temperatures.

REFERENCE EXAMPLE 1

A mixture was prepared by adding 50 parts of 1-octene as a reactive diluent to 100 parts of the copolymer [4] obtained in Production Example 2, followed by sufficient stirring.

REFERENCE EXAMPLE 2

A mixture was prepared in the same manner as in Reference Example 1 except that the same amount of 4-vinylcyclohexene was used in lieu of the reactive diluent used in Example 13.

REFERENCE EXAMPLE 3

A mixture was prepared in the same manner as in Reference Example 1 except that the same amount of allyl acetate was used in lieu of the reactive diluent used in Example 13.

REFERENCE EXAMPLE 4

A mixture was prepared in the same manner as in Reference Example 1 except that the same amount of 1,1-diacetoxy-2-propene was used in lieu of the reactive diluent used in Example 13.

TABLE 2

|  |  | Example 8 | Example 9 | Example 10 | Example 11 | Example 12 | Compar. Ex. 4 | Compar. Ex. 5 |
|---|---|---|---|---|---|---|---|---|
| Component (A) | Mole ratio | 1 | 1 | 1 | 1 | 1 | 1 | 1 |
| Component (B) |  | 2.32 | 2.32 | 2.32 | 2.32 | 2.32 | 2.32 | 2.32 |
| Component (C) |  | 0.00065 × 1 | 0.00065 × 1 | 0.00065 × 1 | 0.00065 × 1 | 0.00065 × 1 | 0.00065 × 1 | 0.00065 × 1 |
| Component (D) |  | 0.00065 × 85 | 0.00065 × 85 | 0.00065 × 85 | 0.00065 × 85 | 0.00065 × 85 | 0 | 0 |
| Component (E) |  | 0.00065 × 5 | 0.00065 × 10 | 0.00065 × 20 | 0.00065 × 40 | 0 | 0.00065 × 10 | 0 |
| SUT(150° C.) | 0 h | 49 s | 46 s | 52 s | 53 s | 14 s | 47 s | 4 s |
|  | 4 h | 43 s | 48 s | 56 s | 56 s | 13 s | 62 s | Gelation |
|  | 8 h | 46 s | 51 s | 56 s | 58 s | 12 s | 107 s | — |
|  | 1 d | 47 s | 53 s | 56 s | 58 s | Gelation | 112 s | — |

REFERENCE EXAMPLE 5

A mixture was prepared in the same manner as in Reference Example 1 except that the same amount of methyl 1-undenenoate was used in lieu of the reactive diluent used in Example 13.

REFERENCE EXAMPLE 6

A mixture was prepared in the same manner as in Reference Example 1 except that the same amount of 8-acetoxy-1,6-octadiene was used in lieu of the reactive diluent used in Example 13.

EVALUATION IN REFERENCE EXAMPLES 1 TO 6

The mixtures obtained in Reference Examples 1 to 6 were each allowed to stand at room temperature or at 50° C. for 2 weeks. Then, each mixture was checked for the condition of mixing using a centrifuge, whereupon it showed no phase separation at all and remained in a fully compatible condition.

In Examples 13 to 16, mentioned below, the amount of the linear siloxane varied from example to example but the amount of the SiH group of the linear siloxane was selected so as to correspond to the sum of 1.80 equivalents of the alkenyl group in the copolymer [4] and 1.00 equivalent of the alkenyl group in the reactive diluent.

EXAMPLE 13

A formulation was prepared by admixing 5 parts of methyl 1-undecenoate (as a reactive diluent) with 100 parts of the copolymer [4] obtained in Production Example 2 and further adding a linear siloxane (containing, on an average, 5 hydrosilyl groups and, on an average, 5 α-methylstyrene groups in each molecule) and a platinum catalyst (platinum (0)-1,1,3,3-tetramethyl-1,3-divinyldisiloxane complex), followed by through stirring. {The SiH group in the linear siloxane amounted to 1.26 times (mole ratio) the total alkenyl group content in the copolymer [4]/reactive diluent; the platinum atom in the catalyst amounted to $5 \times 10^{-4}$ times (mole ratio) the total alkenyl group content in the copolymer [4]/reactive diluent.}

EXAMPLE 14

A formulation was prepared in the same manner as in Example 13 except that the platinum catalyst of Example 13 was used in an amount of $2 \times 10^{-4}$ equivalents relative to the total alkenyl group content in the copolymer [3]/reactive diluent.

EXAMPLE 15

A formulation was prepared in the same manner as in Example 13 except that the reactive diluent of Example 13 was used in an amount of 10 parts and the linear siloxane was used in an amount of 1.26 equivalents relative to the total alkenyl group content in the copolymer [3]/reactive diluent.

EXAMPLE 16

A formulation was prepared in the same manner as in Example 14 except that the same equivalent amount of a linear siloxane containing, on an average, 27.2 hydrosilyl groups and, on an average, 9.8 α-methylstyrene groups in the molecule was used in lieu of the linear siloxane used in Example 14.

COMPARATIVE EXAMPLE 6

A formulation was prepared in the same manner as in Example 13 except that the reactive diluent of Example 13 was not used and the linear siloxane was used in an amount of 1.80 equivalents relative to the total alkenyl group content in the copolymer [3]/reactive diluent.

COMPARATIVE EXAMPLE 7

A formulation was prepared in the same manner as in Example 14 except that the reactive diluent of Example 14 was used in an amount of 120 parts.

EVALUATION IN EXAMPLES 13 TO 16 AND COMPARATIVE EXAMPLES 6 AND 7

The formulations of Examples 13 to 16 and Comparative Examples 6 and 7 were each degassed under reduced pressure, then cast into a mold and cured by heating at 150° C. At the same time, each formulation was measured for snap-up time (SUP: time until manifestation of rubber elasticity, observed using a toothpick) on a hot plate heated at 130° C. Each formulation was further measured for viscosity and gel fraction of curing products. The results of these measurements are shown in Table 3.

TABLE 3

|  | Component (A) (parts) | Component (G) (parts) | Component (B) Amount of SiH used for modification | (parts) | Pt Catalyst (Alkenyl Equivalent) | SUT (sec) | Viscosity (Pa · s) | Gel fraction (%) |
|---|---|---|---|---|---|---|---|---|
| Example 13 | 100 | 5 | 5 | 12.75 | 5.0E−04 | 7 | 75 | 85 |
| Example 14 | 100 | 5 | 5 | 12.75 | 2.0E−04 | 13 | 75 | 78 |
| Example 15 | 100 | 10 | 5 | 19.56 | 5.0E−04 | 60 | 40 | 73 |
| Example 16 | 100 | 5 | 27.2 | 6.14 | 2.0E−04 | 4 | 160 | 95 |
| Compar. Ex. 6 | 100 | 0 | 5 | 5.94 | 2.0E−04 | 4 | 350 | 93 |
| Compar. Ex. 7 | 100 | 120 | 5 | 169.32 | 2.0E−04 | No curing products obtained | | |

Furthermore, No. 2 (⅓) dumbbell test specimens were punched out from the sheet-like curing products obtained in Examples 14 and 16 and Comparative Example 6 and tested for tensile properties using a Shimadzu autograph (measurement environment: 23° C., pulling rate: 200 mm/min). The results are shown in Table 4.

TABLE 4

|  | M50 (MPa) | Tb (MPa) | Eb (%) |
|---|---|---|---|
| Example 14 | 0.03 | 0.32 | 460 |
| Example 16 | 0.27 | 0.85 | 120 |
| Compar. Ex. 6 | 0.11 | 0.54 | 230 |

The sample residues after punching out of the test specimens were allowed to stand at 150° C. for about 30 days, and the changes in weight were checked. The results are shown in Table 5.

TABLE 5

|  | Weight loss (%) |
|---|---|
| Example 14 | <1 |
| Example 16 | <1 |
| Compar. Ex. 6 | <1 |

The formulations of Examples 13 to 16 and Comparative Example 6 gave curing products having rubber-like elasticity but the formulation of Comparative Example 7 failed to give proper curing products.

As the above results indicate, the use of a reactive diluent could reduce the viscosity of each formulation and made it possible to maintain good heat resistance.

EXAMPLE 17

F-200 (10 g, product of Asahi Carbon) as a filler was admixed with 100 g of the copolymer [4] obtained in Production Example 2, and the mixture was uniformly kneaded on a three-roll paint mill. To this formulation were further added a linear siloxane (containing, on an average, 5 hydrosilyl groups and, on an average, 5 α-methylstyrene groups), a platinum catalyst (platinum(0)-1,1,3,3-tetramethyl-1,3-divinyldisiloxane complex) and a curing retarder (3,5-dimethyl-1-hexyn-3-ol), and the mixture was thoroughly stirred to give a formulation. {The SiH group in the linear siloxane amounted to 1.80 times (mole ratio) the alkenyl group content in the copolymer [3]; the platinum atom in the catalyst amounted to $3 \times 10^{-4}$ times (mole ratio) the alkenyl group content in the copolymer [3]; and the curing retarder was added in an amount of 150 times (mole ratio) relative to the platinum catalyst.}

After thorough degassing, this formulation was stored at 150° C. for 100 minutes, whereby a sheet-like curing product was obtained.

EXAMPLE 18

A curing product was produced in the same manner as in Example 17 except that 30 g of #60 HN (product of Asahi Carbon) was used in lieu of F-200 of Example 17.

EXAMPLE 19

A curing product was produced in the same manner as in Example 17 except that 30 g of #66 (product of Asahi Carbon) was used in lieu of F-200 of Example 17.

EXAMPLE 20

A curing product was produced in the same manner as in Example 17 except that 30 g of #60 UG (product of Asahi Carbon) was used in lieu of F-200 of Example 17.

EXAMPLE 21

A curing product was produced in the same manner as in Example 17 except that 10 g of NITERON #10 (product of Nippon Steel Chemical Carbon Co., Ltd.) was used in lieu of F-200 of Example 17.

EXAMPLE 22

A curing product was produced in the same manner as in Example 17 except that 30 g of HTC SH (product of Nippon Steel Chemical Carbon Co., Ltd.) was used in lieu of F-200 of Example 17.

EXAMPLE 23

A curing product was produced in the same manner as in Example 17 except that 30 g of HTC SL (product of Nippon Steel Chemical Carbon Co., Ltd.) was used in lieu of F-200 of Example 17.

COMPARATIVE EXAMPLE 8

A curing product was produced in the same manner as in Example 17 except that the carbon black of Example 17 was not added.

EVALUATION 1 IN EXAMPLES 17 TO 23 AND COMPARATIVE EXAMPLE 8

In producing the curing products of Examples 17 to 23 and Comparative Example 8, each formulation was measured for snap-up time (time until manifestation of rubber elasticity, observed using a toothpick) simultaneously on a hot plate at 130° C. The results are shown in Table 6.

TABLE 6

|  | Carbon black | phr | Snap-up time (sec) |
|---|---|---|---|
| Example 17 | Asahi F-200 | 10 | 16 |
| Example 18 | Asahi #60HN | 30 | 11 |
| Example 19 | Asahi #66 | 30 | 11 |
| Example 20 | Asahi #60UG | 30 | 8 |
| Example 21 | NITERON #10 | 10 | 18 |
| Example 22 | HTC #SH | 30 | 10 |
| Example 23 | HTC #SL | 30 | 9 |
| Compar. Ex. 8 | — | — | 10 |

EVALUATION 2 IN EXAMPLES 17 TO 23 AND COMPARATIVE EXAMPLES 8

Further, No. 2 (⅓) dumbbell test specimens (JIS K 7113) were punched out from the sheet-like curing product obtained in each of Examples 17 to 23 and Comparative Example 8 and tested for tensile properties using a Shimadzu autograph (measurement environment: 23° C., pulling rate: 200 mm/min). Each curing product was also measured for gel fraction (toluene-insoluble matter). The results thus obtained are shown in Table 7.

TABLE 7

|  | Carbon black | phr | M50 (MPa) | M100 (MPa) | M150 (MPa) | Tmax (MPa) | Eb (%) | Gel fraction(%) |
|---|---|---|---|---|---|---|---|---|
| Example 17 | Asahi F-200 | 10 | 0.167 | 0.376 | 0.712 | 2.156 | 320 | 92 |
| Example 18 | Asahi #60HN | 30 | 0.387 | 0.999 | 1.697 | 3.921 | 270 | 94 |
| Example 19 | Asahi #66 | 30 | 0.301 | 0.804 | 1.655 | 3.334 | 220 | 95 |
| Example 20 | Asahi #60UG | 30 | 0.341 | 0.845 | 1.477 | 3.792 | 290 | 93 |
| Example 21 | NITERON #10 | 10 | 0.119 | 0.249 | 0.484 | 1.967 | 360 | 91 |
| Example 22 | HTC #SH | 30 | 0.32 | 0.971 | 1.788 | 3.786 | 250 | 94 |
| Example 23 | HTC #SL | 30 | 0.252 | 0.647 | 1.279 | 2.897 | 260 | 95 |
| Compar. Ex. 8 | — | — | 0.074 | 0.139 | 0.244 | 0.436 | 210 | 95 |

From the above results, it was revealed that by using carbon black, it becomes possible to obtain curable compositions capable of giving curing products improved in tensile strength at break without significantly affecting the good heat resistance, oil resistance and curability, among others.

INDUSTRIAL APPLICABILITY

The first aspect of the invention, which has the constitution described above, can provide curable compositions excellent in storage stability at elevated temperatures. The handling thereof at elevated temperatures thus becomes possible, so that it becomes possible to handle them as liquid compositions relatively low in viscosity without using a large amount of a diluent or the like.

The second aspect of the invention, which has the constitution described above, can provide curable compositions low in viscosity and, when cured, capable of giving curing products with various properties such as mechanical properties and heat resistance being prevented from decreasing.

The third aspect of the invention, which has the constitution described above, can provide curable compositions capable of giving curing products higher in tensile strength at break without their good heat resistance, oil resistance, curability and the like features being influenced.

The vinyl polymer to be used is produced preferably by living radical polymerization, more preferably by atom transfer radical polymerization, whereby the molecular weight and functionalization percentage can be precisely controlled, hence the physical properties can properly controlled.

The invention claimed is:

1. A curable composition which comprises, as essential components, the following five components:
    (A) a vinyl polymer having at least one hydrosilylatable alkenyl group within the molecule,
    (B) a hydrosilyl group-containing compound,
    (C) a hydrosilylation catalyst,
    (D) an aliphatic unsaturated bond-containing compound, and
    (F) an electric conductivity providing substance;
        wherein the vinyl polymer (A) has a main chain composed of at least one monomer selected from the group consisting of (meth)acrylic monomers, nitrile group-containing vinyl monomers, and fluorine-containing vinyl monomers, and wherein the vinyl polymer (A) has at least one hydrosilylatable alkenyl group at a molecular chain terminus thereof.

2. The curable composition according to any of claim 1, wherein the electric conductivity providing substance (F) is carbon black.

3. The curable composition according to claim 1, wherein the vinyl polymer (A) has a molecular weight distribution value of less than 1.8.

4. The curable composition according to claim 1, wherein the vinyl polymer (A) is a (meth)acrylic polymer.

5. The curable composition according to claim 4, wherein the vinyl polymer (A) is an acrylic polymer.

6. The curable composition according to claim 5, wherein the vinyl polymer (A) is an acrylic ester polymer.

7. The curable composition according to claim 1, wherein the main chain of the vinyl polymer (A) is one produced by living radical polymerization.

8. The curable composition according to claim 7, wherein the living radical polymerization is carried out in the manner of atom transfer radical polymerization.

9. The curable composition according to claim 8, in which the atom transfer radical polymerization is carried out using; as a catalyst, at least one member selected from among transition metal complexes
    the central metal of which is an element of the group 7, 8, 9, 10 or 11 of the periodic table of the elements.

10. The curable composition according to claim 9, wherein at least one transition metal complex selected from the group consisting of complexes of copper, nickel, ruthenium or iron is used as the catalyst.

11. The curable composition according to claim 10, wherein the metal complex catalyst is a copper complex.

12. The curable composition according to claim 1, wherein the vinyl polymer (A) is one obtained by the steps of:
    (1) producing a vinyl polymer having a terminal structure represented by the general formula (1):

—C(R$^1$)(R$^2$)(X)  (1)

wherein R$^1$ and R$^2$ each represents a group bound to an ethylenically unsaturated group of the vinyl monomer and X represents a chlorine, bromine or iodine atom,
    by polymerizing a vinyl monomer(s) in the manner of atom transfer radical polymerization and
    (2) converting the terminal halogen of said polymer to a substituent having a hydrosilylatable alkenyl group.

13. The curable composition according to claim 1, wherein the vinyl polymer (A) is one obtained by the steps of:
    (1) forming a vinyl polymer molecular chain by polymerizing a vinyl monomer(s) in the manner of living radical polymerization and
    (2) then reacting a compound having at least two low polymerizable alkenyl groups with the active terminus of the above polymer.

14. The curable composition according to claim 1, wherein the hydrosilyl group-containing compound (B) is an organohydrogenpolysiloxane.

15. The curable composition according to claim 1, wherein the aliphatic unsaturated bond-containing compound (D) is an acetylene alcohol.

16. The curable composition according to claim 1, wherein the aliphatic unsaturated bond-containing compound (D) is an α,β-unsaturated carboxylic acid ester.

17. The curable composition according to claim 16, wherein the aliphatic unsaturated bond-containing compound (D) is a maleic acid ester.

18. The curable composition according to claim 1, wherein the aliphatic unsaturated bond-containing compound (D) has a molecular weight of not lower than 110.

19. The curable composition according to claim 1, wherein the aliphatic unsaturated bond-containing compound (D) has a boiling point at ordinary pressure, of not lower than 140° C.

20. The curable composition according to claim 1, which further comprises:
(E) an amine compound.

21. The curable composition according to claim 20, wherein the amine compound (E) is an amine compound containing two nitrogen atoms in each molecule.

22. The curable composition according to claim 21, wherein the amine compound (E) has the following structural formula:

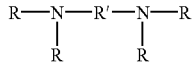

wherein the four R groups may be the same or different and each is a univalent hydrocarbon group containing 1 to 20 carbon atoms or a hydrogen atom and any two R groups may be connected to each other and
wherein R' is a divalent hydrocarbon group containing 1 to 24 carbon atoms.

23. The curable composition according to claim 22, wherein the amine compound (E) is N,N,N',N'-tetramethylethylenediamine.

24. A method of using a curable composition which comprises, as essential components, the following four components:
(A) a vinyl polymer having at least one hydrosilylatable alkenyl group within the molecule,
(B) a hydrosilyl group-containing compound,
(C) a hydrosilylation catalyst, and
(D) an aliphatic unsaturated bond-containing compound, which method comprises causing the curable composition to flow at a temperature of not lower than 30° C. but lower them 100° C.

25. The method according to claim 24, wherein the flowing temperature is not lower than 40° C. but lower than 80° C.

26. A method of using a curable composition which comprises, as essential components, the following four components:
(A) a vinyl polymer having at least one hydrosilylatable alkenyl group within the molecule,
(B) a hydrosilyl group-containing compound,
(C) a hydrosilylation catalyst, and
(D) an aliphatic unsaturated bond-containing compound, which method comprises causing the curable composition to flow at a temperature of not lower than 30° C. but lower than 100° C. and
further carrying out the curing reaction while allowing the composition to flow.

27. A curable composition which comprises, as essential components, the following three components:
(A) a vinyl polymer having at least one hydrosilylatable ailcenyl group within the molecule,
(B) a hydrosilyl group-containing compound, and
(H) carbon black, and wherein the carbon black has a pH of not higher than 9.5,
wherein the vinyl polymer (A) has a main chain composed of at least one monomer selected from the group consisting of (meth)acrylic monomers, nitrile group-containing vinyl monomers, and fluorine-containing vinyl monomers;
wherein the vinyl polymer (A) has at least one hydrosilylatable alkenyl group at a molecular chain terminus thereof.

28. The curable composition according to claim 27, wherein the vinyl polymer (A) has a molecular weight distribution value of less than 1.8.

29. The curable composition according to claim 27, wherein the vinyl polymer (A) is a (meth)acrylic polymer.

30. The curable composition according to claim 29, wherein the vinyl polymer (A) is an acrylic polymer.

31. The curable composition according to claim 30, wherein the vinyl polymer (A) is an acrylic ester polymer.

32. The curable composition according to claim 27, wherein the main chain of the vinyl polymer (A) is one produced by living radical polymerization.

33. The curable composition according to claim 32, wherein the living radical polymerization is carried out in the manner of atom transfer radical polymerization.

34. The curable composition according to claim 33, in which the atom transfer radical polymerization is carried out using, as a catalyst, at least one member selected from among transition metal complexes
the central metal of which is an element of the group 7, 8, 9, 10 or 11 of the periodic table of the elements.

35. The curable composition according to claim 34, wherein at least one transition metal complex selected from the group consisting of complexes of copper, nickel, ruthenium or iron is used as the catalyst.

36. The curable composition according to claim 35, wherein the metal complex catalyst is a copper complex.

37. The curable composition according to claim 27, wherein the vinyl polymer (A) is one obtained by the steps of:
(1) producing a vinyl polymer having a terminal structure represented by the general formula (1):

wherein $R^1$ and $R^2$ each represents a group bound to an ethylenically unsaturated group of the vinyl monomer and X represents a chlorine, bromine or iodine atom,
by polymerizing a vinyl monomer(s) in the manner of atom transfer radical polymerization and
(2) converting the terminal halogen of said polymer to a substituent having a hydrosilylatable alkenyl group.

38. The curable composition according to claim 27, wherein the vinyl polymer (A) is one obtained by the steps of:
(1) forming a vinyl polymer molecular chain by polymerizing a vinyl monomer(s) in the manner of living radical polymerization and
(2) then reading a compound having at least two low polymerizable alkenyl groups with the active terminus of the above polymer.

39. The curable composition according to claim 27, wherein the hydrosilyl group-containing compound (B) is an organohydrogenpolysiloxane.

40. A curable composition which comprises, as essential components, the following three components:
(A) a vinyl polymer having at least one hydrosilylatable alkenyl group within the molecule,
(B) a hydrosilyl group-containing compound, and
(H) carbon black, and
wherein a curing product derived from the curable composition has a tensile strength at break of not lower than 1 MPa.

41. The curable composition according to claim 40, wherein a curing product derived from the curable composition has a tensile strength at break of not lower than 1.5 MPa.

42. A curable composition which comprises, as essential components, the following three components:
(A) a vinyl polymer having at least one hydrosilylatable alkenyl group within the molecule,
(B) a hydrosilyl group-containing compound, and
(H) carbon black, and
wherein a curing product derived from the curable composition has a breaking elongation of not less than 50%.

43. The curable composition according to claim 42, wherein a curing product derived from the curable composition has a breaking elongation of not less than 100%.

44. A curable composition which comprises, as essential components, the following three components:
(A) a vinyl polymer having at least one hydrosilylatable alkenyl group within the molecule,
(B) a hydrosilyl group-containing compound, and
(H) carbon black, and
wherein, owing to its containing carbon black (H), the curable composition gives a curing product showing a tensile strength at break at least 1.5 times higher as compared with the case of its being free of carbon black.

45. The curable composition according to claim 44, wherein, owing to its containing carbon black (H),
the curable composition can give a curing product showing a tensile strength at break at least 2 times higher as compared with the case of its being free of carbon black.

* * * * *

UNITED STATES PATENT AND TRADEMARK OFFICE
CERTIFICATE OF CORRECTION

PATENT NO. : 7,026,397 B2  Page 1 of 1
APPLICATION NO. : 10/203422
DATED : April 11, 2006
INVENTOR(S) : Nobuhiro Hasegawa et al.

It is certified that error appears in the above-identified patent and that said Letters Patent is hereby corrected as shown below:

Claim 24, column 47, line 51 should read as "C. but lower ~~them~~ than 100°C."

Claim 27, column 48, line 4 should read as "~~aileenyl~~ alkenyl group within the molecule,"

Signed and Sealed this

Twelfth Day of December, 2006

JON W. DUDAS
*Director of the United States Patent and Trademark Office*